US011625962B2

(12) United States Patent
Brunda et al.

(10) Patent No.: US 11,625,962 B2
(45) Date of Patent: Apr. 11, 2023

(54) SYSTEM, METHOD, AND COMPUTER PROGRAM PRODUCT FOR PROVIDING APPLICATION-BASED ASSISTANCE WITH VEHICLE EMISSION TEST COMPLIANCE

(71) Applicant: Innova Electronics Corporation, Irvine, CA (US)

(72) Inventors: Bruce B. Brunda, Newport Beach, CA (US); Ieon Chen, Irvine, CA (US)

(73) Assignee: Innova Electronics Corporation, Irvine, CA (US)

( * ) Notice: Subject to any disclaimer, the term of this patent is extended or adjusted under 35 U.S.C. 154(b) by 0 days.

(21) Appl. No.: 17/745,842

(22) Filed: May 16, 2022

(65) Prior Publication Data

US 2023/0063381 A1   Mar. 2, 2023

Related U.S. Application Data

(63) Continuation-in-part of application No. 17/675,176, filed on Feb. 18, 2022, now Pat. No. 11,455,841,
(Continued)

(51) Int. Cl.
*G07C 5/08* (2006.01)
*G07C 5/00* (2006.01)
(Continued)

(52) U.S. Cl.
CPC ......... *G07C 5/0808* (2013.01); *G06Q 30/018* (2013.01); *G06Q 30/0639* (2013.01);
(Continued)

(58) Field of Classification Search
CPC ...... G07C 5/0808; G07C 5/006; G07C 5/008; G07C 5/0825; G07C 2205/02;
(Continued)

(56) References Cited

U.S. PATENT DOCUMENTS 5,020,135 A   5/1991   Kasparian et al.
D334,560 S    4/1993   Wilson
(Continued)

FOREIGN PATENT DOCUMENTS

KR   100456024 B1   10/2004
WO   1999023783 A2  10/1998
(Continued)

OTHER PUBLICATIONS

SPX Corporation, Genisys Evo catalog, 2011, 8 pages.

*Primary Examiner* — Michael V Kerrigan
(74) *Attorney, Agent, or Firm* — Stetina Brunda Garred & Brucker

(57) ABSTRACT

A method of providing mobile application-based assistance with vehicle emissions testing compliance includes establishing a user profile associated with a user of a mobile communication device, receiving, from an emissions test provider identified by the mobile application, diagnostic data retrieved from the vehicle using a diagnostic tool and subsequently uploaded to the at least one server, providing the received diagnostic data to a government-authorized server that is capable of deriving an emissions test result for the registered vehicle based on the received diagnostic data, receiving the emissions test result from the government-authorized server, associating the emissions test result with the user profile by matching a VIN included in the received diagnostic data with a VIN included in the user profile, and providing the emissions test result to the mobile communication device, the emissions test result being displayable on the mobile communication device by the mobile application.

78 Claims, 14 Drawing Sheets

Related U.S. Application Data which is a continuation-in-part of application No. 17/458,154, filed on Aug. 26, 2021, now Pat. No. 11,335,139.

(51) Int. Cl.
*G06Q 30/018* (2023.01)
*G06Q 30/0601* (2023.01)

(52) U.S. Cl.
CPC ............ *G07C 5/006* (2013.01); *G07C 5/008* (2013.01); *G07C 5/0825* (2013.01); *G07C 2205/02* (2013.01)

(58) Field of Classification Search
CPC .. G06Q 30/08; G06Q 30/018; G06Q 30/0639; H04W 4/021; H04W 4/023
See application file for complete search history.

(56) References Cited

U.S. PATENT DOCUMENTS

| | | |
|---|---|---|
| 5,347,211 A | 9/1994 | Jakubowski |
| 5,499,182 A | 3/1996 | Ousborne |
| 5,541,840 A | 7/1996 | Krzysztof et al. |
| D377,622 S | 1/1997 | Chen et al. |
| 5,623,922 A | 4/1997 | Smith |
| 5,635,841 A | 6/1997 | Taylor |
| 5,671,141 A | 9/1997 | Smith et al. |
| 5,758,300 A | 5/1998 | Abe |
| 5,767,681 A | 6/1998 | Huang |
| 5,794,164 A | 8/1998 | Beckert et al. |
| 5,808,907 A | 9/1998 | Shetty et al. |
| 5,809,437 A | 9/1998 | Breed |
| 5,848,365 A | 12/1998 | Coverdill |
| 5,859,628 A | 1/1999 | Ross et al. |
| 5,884,202 A | 3/1999 | Arjomand |
| 6,000,413 A | 12/1999 | Chen |
| 6,052,631 A | 4/2000 | Busch et al. |
| 6,055,468 A | 4/2000 | Kaman et al. |
| 6,094,609 A | 7/2000 | Arjomand |
| 6,104,988 A | 8/2000 | Klarer |
| 6,225,898 B1 | 5/2001 | Kamiya et al. |
| 6,263,268 B1 | 7/2001 | Nathanson |
| 6,295,492 B1 | 9/2001 | Lang et al. |
| 6,314,422 B1 | 11/2001 | Barker et al. |
| 6,389,337 B1 | 5/2002 | Kolls |
| 6,438,471 B1 | 8/2002 | Katagishi et al. |
| 6,442,460 B1 | 8/2002 | Larson et al. |
| 6,499,385 B2 | 12/2002 | Protti |
| 6,535,112 B1 | 3/2003 | Rothschink |
| 6,587,768 B2 | 7/2003 | Chene et al. |
| 6,611,740 B2 | 8/2003 | Lowrey et al. |
| 6,650,318 B1 | 11/2003 | Amon |
| 6,718,425 B1 | 4/2004 | Pajakowski et al. |
| 6,732,031 B1 | 5/2004 | Lightner et al. |
| 6,738,697 B2 | 5/2004 | Breed |
| 6,768,935 B1 | 7/2004 | Morgan et al. |
| 6,807,469 B2 | 10/2004 | Funkhouser et al. |
| 6,836,708 B2 | 12/2004 | Tripathi |
| 6,847,916 B1 | 1/2005 | Ying |
| 6,868,369 B2 | 3/2005 | Huang et al. |
| 6,925,368 B2 | 8/2005 | Funkhouser et al. |
| 6,940,270 B2 | 9/2005 | Chen |
| D510,287 S | 10/2005 | Chen et al. |
| 6,957,133 B1 | 10/2005 | Hunt et al. |
| 6,968,733 B2 | 11/2005 | Andreasen et al. |
| 7,030,742 B2 | 4/2006 | Treadway |
| 7,085,680 B2 | 8/2006 | Huang |
| 7,089,099 B2 | 8/2006 | Shostak et al. |
| 7,103,460 B1 | 9/2006 | Breed |
| 7,116,216 B2 | 10/2006 | Andreasen et al. |
| 7,209,813 B2 | 4/2007 | Namaky |
| D545,223 S | 6/2007 | Chen |
| D558,621 S | 1/2008 | Rich et al. |
| D559,137 S | 1/2008 | Protti |
| D560,129 S | 1/2008 | Rich et al. |
| D560,527 S | 1/2008 | Rich et al. |
| 7,325,775 B2 | 2/2008 | Chen |
| D563,249 S | 3/2008 | Chen |
| 7,363,149 B2 | 4/2008 | Klausner et al. |
| D569,280 S | 5/2008 | Chen |
| 7,376,497 B2 | 5/2008 | Chen |
| D571,241 S | 6/2008 | Andreasen et al. |
| 7,409,317 B2 | 8/2008 | Cousin et al. |
| 7,421,321 B2 | 9/2008 | Breed et al. |
| 7,437,227 B2 | 10/2008 | Andreasen et al. |
| D581,822 S | 12/2008 | Madison et al. |
| 7,464,000 B2 | 12/2008 | Huang |
| D590,387 S | 4/2009 | Chen |
| 7,520,668 B2 | 4/2009 | Chen |
| 7,603,293 B2 | 10/2009 | Chenn |
| 7,620,484 B1 | 11/2009 | Chen |
| D610,586 S | 2/2010 | Chen |
| 7,778,750 B2 | 8/2010 | Knight et al. |
| D624,446 S | 9/2010 | Chen et al. |
| D624,838 S | 10/2010 | Chen et al. |
| D625,209 S | 10/2010 | Chen et al. |
| D625,210 S | 10/2010 | Chen et al. |
| D625,634 S | 10/2010 | Chen et al. |
| 7,904,219 B1 | 3/2011 | Lowrey et al. |
| 8,019,503 B2 | 9/2011 | Andreasen et al. |
| 8,024,083 B2 | 9/2011 | Chenn |
| D646,188 S | 10/2011 | Chen et al. |
| D646,599 S | 10/2011 | Chen et al. |
| 8,032,419 B2 | 10/2011 | Chenn |
| 8,068,951 B2 | 11/2011 | Chen et al. |
| 8,131,417 B2 | 3/2012 | Picard |
| 8,301,329 B2 | 10/2012 | Andreasen et al. |
| 8,306,687 B2 | 11/2012 | Chen |
| 8,370,018 B2 | 2/2013 | Andreasen et al. |
| 8,509,986 B1 | 8/2013 | Chen |
| 8,630,765 B2 | 1/2014 | Chen |
| 8,825,271 B2 | 9/2014 | Chen |
| 8,855,621 B2 | 10/2014 | Chen |
| 8,862,117 B2 | 10/2014 | Chen |
| 8,909,416 B2 | 12/2014 | Chen et al. |
| 9,002,554 B2 | 4/2015 | Chen |
| 9,014,908 B2 | 4/2015 | Chen et al. |
| 9,026,400 B2 | 5/2015 | Chen et al. |
| 9,177,428 B2 | 11/2015 | Nguyen et al. |
| 9,646,432 B2 | 5/2017 | Madison et al. |
| 10,643,403 B2 | 5/2020 | Madison et al. |
| 2001/0033225 A1 | 10/2001 | Razavi et al. |
| 2002/0007237 A1 | 1/2002 | Phung et al. |
| 2002/0010541 A1 | 1/2002 | Houston et al. |
| 2002/0035421 A1 | 3/2002 | Warkentin |
| 2003/0171111 A1 | 9/2003 | Clark |
| 2004/0110472 A1 | 6/2004 | Witkowski et al. |
| 2004/0227523 A1 | 11/2004 | Namaky |
| 2005/0192727 A1 | 9/2005 | Shostak et al. |
| 2009/0276115 A1 | 11/2009 | Chen |
| 2011/0071720 A1 | 3/2011 | Schondorf et al. |
| 2011/0123039 A1 | 5/2011 | Hirschfeld et al. |
| 2011/0224866 A1 | 9/2011 | Chen |
| 2011/0264322 A1 | 10/2011 | Chen |
| 2011/0307144 A1 | 12/2011 | Wu et al. |
| 2012/0215398 A1 | 8/2012 | Chen et al. |
| 2013/0297143 A1 | 11/2013 | Chen et al. |
| 2014/0046800 A1 | 2/2014 | Chen |
| 2014/0052328 A1 | 2/2014 | Nguyen et al. |
| 2014/0180513 A1* | 6/2014 | Kozloski ............... B60W 10/06 903/902 |
| 2019/0304208 A1 | 10/2019 | Chen et al. |
| 2019/0304213 A1 | 10/2019 | Chen et al. |

FOREIGN PATENT DOCUMENTS

| | | |
|---|---|---|
| WO | 1998051991 A1 | 11/1998 |
| WO | 2001086576 A1 | 11/2001 |

\* cited by examiner

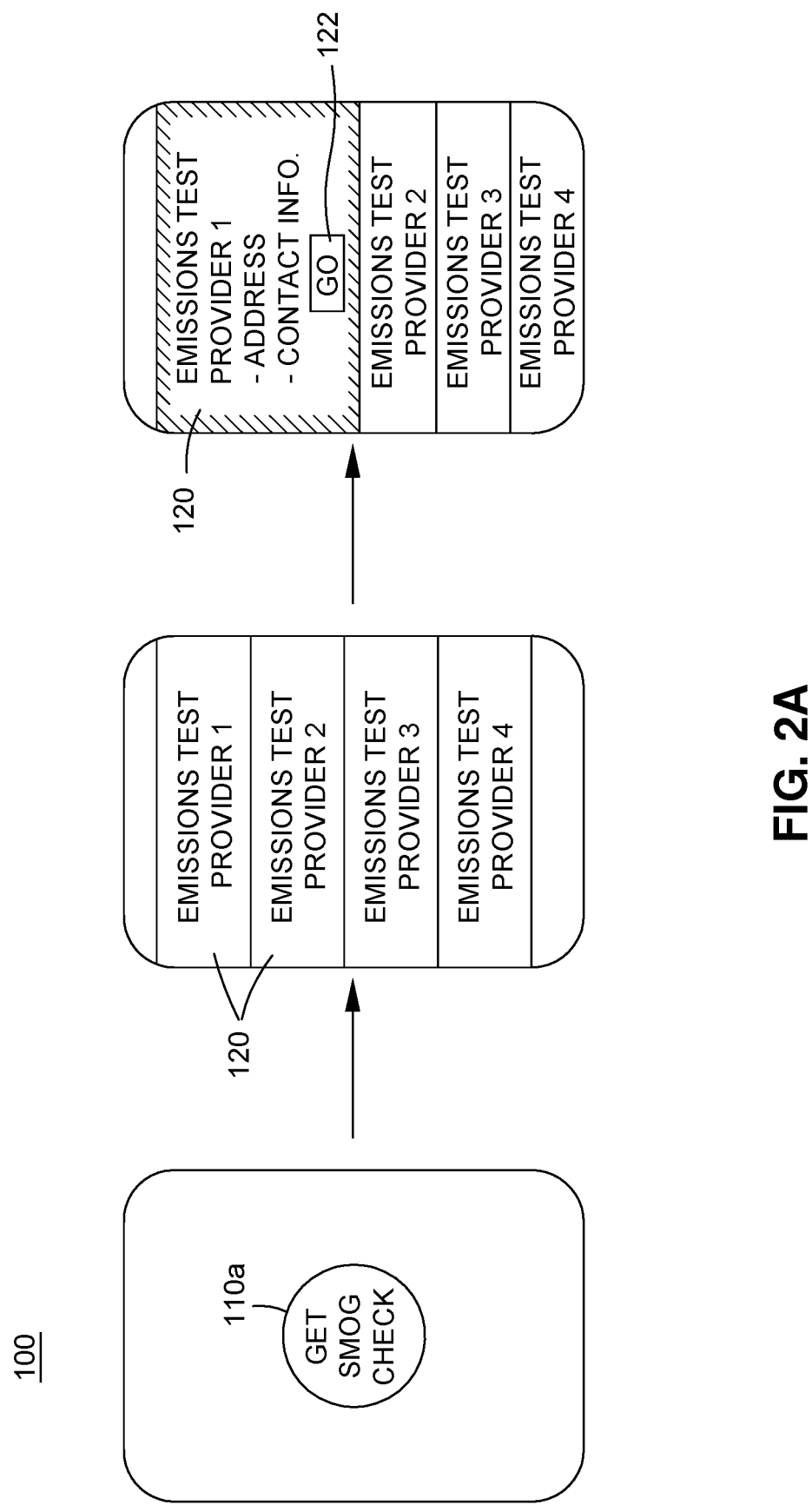

SYSTEM, METHOD, AND COMPUTER PROGRAM PRODUCT FOR PROVIDING APPLICATION-BASED ASSISTANCE WITH VEHICLE EMISSION TEST COMPLIANCE

CROSS-REFERENCE TO RELATED APPLICATIONS

This application is a continuation-in-part of U.S. patent application Ser. No. 17/675,176, filed Feb. 18, 2022 and entitled "SYSTEM AND METHOD FOR SELECTIVE VEHICLE DATA RETRIEVAL," which is a continuation-in-part of U.S. patent application Ser. No. 17/458,154, filed Aug. 26, 2021 and also entitled "SYSTEM AND METHOD FOR SELECTIVE VEHICLE DATA RETRIEVAL," the entire contents of each of which is expressly incorporated by reference herein.

STATEMENT RE: FEDERALLY SPONSORED RESEARCH/DEVELOPMENT

Not Applicable

BACKGROUND

Technical Field

The present disclosure relates to vehicle diagnostic products and services, and more particularly, to a method, system, and application program directed to retrieving, retaining and utilizing vehicle specific diagnostic information in relation to vehicle emissions testing and in other contexts using either an on-board device for communicating with the vehicle diagnostic system, or, where no such device is available, using a network of diagnostic service providers that retrieve and upload the vehicle data to a processor operative to detect and aggregate all vehicle data received from one or more registered vehicles.

Related Art

Among the responsibilities of vehicle owners is government-mandated vehicle testing and/or servicing, in particular vehicle emissions testing (e.g., smog checks), the requirements of which vary from state to state and may change over time as laws and regulations are updated. In addition to being an additional inspection/service appointment for the vehicle owner to remember and keep track of (separate and apart from a dealer's recommended servicing schedule, for example), vehicle emissions testing is burdensome to the vehicle owner because it generally requires the vehicle owner to make an appointment with one of only a handful of certified vehicle emissions test providers, which may involve taking the vehicle to a far away or otherwise inconvenient location. The vehicle must typically be left for a period of time with the emissions test provider, who then performs various tests often including analysis of actual emissions of the vehicle's tailpipe. While some states (notably Oregon) have begun to implement programs that allow for OBD-only testing in certain circumstances, these programs typically have very rigid requirements not only in terms of who may conduct the test, but also in terms of what specific diagnostic tools may be used to interface with the vehicle and what specific software may be used to control the test. It would be of great benefit to vehicle owners, emissions test providers, and government authorities alike for these emissions testing programs to be seamlessly integrated with a vehicle owner facing mobile application, all while complying with the technical limitations of the current regulatory landscape. The ideal system would be compatible with the regulatory and technical requirements of a plurality of emissions testing jurisdictions and would be flexible enough to function either within or alongside the emissions testing process, with varying degrees of involvement, depending on the particular jurisdiction. Moreover, as the regulatory requirements of such programs continue to evolve and the technical limitations are relaxed in the future, it would be advantageous for systems to be in place that streamline the emissions testing process further and take full advantage of improvements in vehicle diagnostics technology.

Such a mobile application (or "app") should alleviate each area of burden imposed on the vehicle owner by the emissions testing program. The app should eliminate any need for the vehicle owner to schedule and manage compliance with emissions testing requirements, proactively letting the vehicle owner know when and where to get the test and delivering the test results directly to the vehicle owner's mobile device. In the event of a failed test, the app should assist the vehicle owner with remedying the underlying cause of the failed test by directing the vehicle owner to local repair shops and auto parts stores in order to help the vehicle owner quickly and cost-effectively bring the vehicle into compliance. Ideally, the app should also save the vehicle owner valuable time and money by helping the vehicle owner to avoid prematurely undertaking an emissions test that is doomed to fail. At the same time, the system underlying the app should drive business to local diagnostic service providers who are capable of performing the emissions test, as well as to vehicle repair shops and auto parts stores, interfacing with their diagnostic tools and computers to provide a mutually beneficial ecosystem for all parties. The system should enhance existing processes in terms of convenience and cost effectiveness, all while respecting data privacy and satisfying security concerns.

Such a system should be beneficial not only to vehicle owners from the standpoint of convenience and cost effectiveness, and not only to emissions test providers and other service/parts providers from the standpoint of increased business opportunities, but further to the relevant government authorities from the standpoint of public interest, as the envisioned systems should help to enhance the security of emissions testing and reduce fraud. Currently, there is a significant problem of tampering and fraudulent activity both on the part of some vehicle owners and on the part of some independently owned emissions test shops. To the extent that the fraud is premised on falsely identifying a vehicle undergoing an emissions test (e.g., by exchange of license plates), the contemplated system should have ways of correctly identifying the vehicle to counter any attempts at deception, incorporating redundant (doubly or triply redundant) mechanisms for confirming the vehicle's identification to increase the degree of certainty. The system should make maximal use of the potentially identifying attributes of diagnostic data obtained from the vehicle during or prior to the emissions test, not only comparing the vehicle identification number (VIN) to a VIN of record but further analyzing the installed controllers and other components of the vehicle to ensure that they match the expected state of the vehicle.

More sophisticated fraudulent activity should be addressed as well. For example, as mandated by the Clean Air Act (CAA), new vehicles must have emissions control devices installed in order to reduce harmful emissions of nitrogen oxides (NOx) to the environment. By tampering with and disabling these devices (e.g., via the installation of so-called "defeat devices"), unscrupulous vehicle owners are able to circumvent the regulations in order to enhance vehicle performance or save on maintenance costs. Existing emissions test systems and procedures are often unable to detect such tampering (or in some cases the emissions test providers may be complicit), resulting in fraudulently passed emissions tests to the great detriment of the environment among other concerns. The contemplated system described herein should ideally serve the public interest and the interests of government authorities by implementing safeguards that make undetected tampering with emissions control devices less likely. Just as the system may analyze the diagnostic data of the vehicle to confirm its identity, the system should likewise be capable of confirming, based on the diagnostic data collected during and prior to an emissions test, whether relevant emissions control devices have been disabled or otherwise tampered with.

More generally, the system should be able to detect tampering, intentional or otherwise, of any vehicle system that could impact the safe operation of the vehicle. When after-market devices and software modifications have been used to customize parameters of the vehicle's automatic transmission or automatic driving assistance system (ADAS), for example, the resulting vehicle may operate in a way that creates a dangerous hazard on public roads (e.g., by driving too close to other vehicles). The system should be able to detect this type of tampering as well, either in the context of a state-mandated emissions test or in connection with enforcement measures associated with future regulations (e.g., directed to self-driving cars). By detecting modifications to various systems that affect the safe operation of the vehicle, the envisioned system can help to prevent traffic accidents caused by such improperly modified vehicles while at the same time benefitting the OEMs of the vehicle systems in question, who have a particular interest in preventing unsafe after-market tampering of the systems they make and sell.

In general, due to the complexity of automotive technology, the rough handling that a vehicle ordinarily endures, and the importance of safety and performance to vehicle owners, vehicle ownership invariably requires periodic servicing of the vehicle. To most vehicle owners, servicing the vehicle entails bringing the vehicle to an expert, typically either a dealership or a trusted, independent auto mechanic. To some do-it-yourselfers (DIYers), servicing the vehicle may entail diagnosing the vehicle using state-of-the-art vehicle diagnostics technology that is compatible with automotive scan tools and consumer mobile devices such as smartphones, for example, and then purchasing auto parts to perform the necessary repairs oneself. In any case, there are occasions when it becomes necessary to seek service and/or part providers outside the habitual patterns of the vehicle owner. This is true even for the most passionate DIYer or the most risk-averse vehicle owner who consistently takes his or her vehicle to the dealership where it was purchased. Cars break down unexpectedly requiring roadside assistance, rare or difficult-to-diagnose defects are encountered, and vehicle owners travel far from their usual service and part providers. Moreover, vehicles change owners, with the different owners having different preferences and habits. As a result, during the life of a vehicle, the many accumulated repair and/or diagnostic "events" will have occurred at a wide variety of locations and will have been handled by a vast array of disparate service providers, including those emissions test "events" contemplated above.

From the perspective of any one automotive service provider who might wish to establish a lasting relationship with the vehicle owner, this makes it exceedingly difficult to acquire and maintain a thorough understanding of the vehicle's condition and history. For example, a provider of automotive diagnostic and repair services might want to provide value to its customers by offering individually tailored services and enhanced diagnostics that take into account information about each particular vehicle. To do this, they might use loyalty and reward programs to entice the vehicle owner to always take the vehicle to them for repairs and/or parts. However, this approach inevitably fails in the long term as the vehicle owner is forced to take the vehicle elsewhere by events outside his or her control. Another approach that may be taken is to encourage the customer to purchase a scan tool or other device that the customer can use to diagnose the vehicle by himself or herself. The service provider can then maintain a proprietary database of vehicle condition reports derived from customer diagnostic data that is retrieved from the customers' vehicles and uploaded using the scan tools. However, these devices can be expensive and not likely to be bought by the average consumer, making it difficult to build such a database for a significant portion of the customer base. Service providers are left with two unsatisfactory outcomes: on the one hand, providing enhanced services to only a small portion of the customer base and, on the other, providing more generic (and less valuable) services to the majority of customers. This unfortunate state of affairs can be seen if one looks at the automotive mobile applications that exist on the market today. Though such apps purport to provide targeted assistance to all vehicle owners, they either require a connection to a vehicle ECU using a dongle or other data acquisition device or else offer little more than generic information that is of little value to a driver in need of assistance.

From the vehicle owner's perspective, the problem is greater still. Vehicle owners want the same individualized services that the service providers would like to provide them with, and, for the most part, they would prefer not to have to buy additional devices besides the smartphones that they already have. But in addition, even for those vehicle owners who would be willing to buy a scan tool or dongle and upload diagnostic data to a service provider's database, there are times when the vehicle owner would prefer not to use this device and would rather seek expert assistance. For example, the vehicle owner may find the dongle inconvenient to use because it drains the vehicle battery if it is left plugged into the OBD port while the vehicle is off. Not wanting to have to remember to unplug the dongle every time he or she turns off the vehicle (and plug it back in when the vehicle is in use), the customer may decide to forgo the use of the dongle altogether or may decide that it is sometimes worth using but other times not. As another example, the vehicle owner may want to obtain multiple scans of their vehicle diagnostic data to notice any differences or trends in the operation of vehicle systems, that may indicate a defect condition is deteriorating further. Further, a vehicle owner may simply want a second opinion and may seek diagnostic services of an expert mechanic in addition to the scan that the vehicle owner performed himself or herself. In general, vehicle owners want the freedom to choose how, when, and where to diagnose and service their vehicles, including in the context of an emissions test, using a common diagnostic portal that integrates vehicle information obtained at different diagnostic service and emissions test providers, that can all be accessed by the vehicle owner using a single application program as contemplated above. This is something that conventional models cannot provide, even to those customers willing to purchase a scan tool or dongle.

Moreover, vehicle owners want to keep a record of their own data. Even when conventional systems work as intended, e.g., with each customer diagnosing his or her own vehicle and uploading the resulting data to build an individualized record, the resulting record is typically not readily accessible to the customer. For example, the vehicle owner may want to view a past vehicle condition report and forward the report to a trusted auto mechanic for further recommendations. Assuming that it is possible for the vehicle owner to see this information at all, the vehicle owner may typically have to contact the service provider via customer service channels in order to gain access to the information. From the perspective of the vehicle owner, who is unconcerned with the business needs of the service provider, it would be better if all the information about his or her vehicle were always at the vehicle owner's fingertips, accessible within a mobile app for any purpose the vehicle owner may have in mind.

The ideal system would solve all of the above problems. A vehicle owner should be free to decide whether to diagnose his or her own vehicle using a scan tool or dongle or to take the vehicle to an expert mechanic of his or her choice. In some instances, the vehicle owner may decide to use a kiosk-based diagnostic system provided at an auto parts store or vehicle service center. The decision should be made freely depending on the circumstances, with the vehicle owner perhaps choosing one route one day and another route the next. If the vehicle does not own or does not choose to use a scan tool or dongle, the app should assist the user with finding a vehicle diagnostics services provider to scan the vehicle, in the context of an emissions test or otherwise. Regardless of how and where the vehicle owner seeks diagnostic and repair services, buys auto parts, or requests roadside assistance, all of the resulting diagnostic data and derived vehicle condition reports should be made available to the user automatically or on demand over the vehicle owner's smart phone or other mobile device. An app installed on the device should make use of all of this accumulated information to provide targeted recommendations to the vehicle owner that are specific to the vehicle including its up-to-date diagnostic condition information collected from disparate sources. The app should empower the vehicle owner while at the same time benefiting business owners by driving vehicle owners to local auto mechanics, parts stores, and roadside assistance service providers.

Moreover, the ideal app would provide additional value by taking full advantage of native mobile device capabilities such as cameras, GPS, accelerometers, and microphones, to name a few. Such powerful capabilities should be fully integrated into the system in a way that treats the mobile device as another sensor for diagnostic data collection and, in doing so, augments the available diagnostic services without detracting from the convenience of the user experience. At the same time, the app should serve as a way for a provider of the system to communicate with the customers using the app and, for example, to present information and offers that are of immediate relevance to the customer as the customer goes about his/her day and as the customer's habits and circumstances change over time. The usefulness of the app should not be limited to those times when the customer is experiencing difficulty with his/her vehicle but should be the user's go-to app for advice, recommendations, and day-to-day convenience in addition to assisting the user with government-mandated emissions tests and in the event of an emergency.

BRIEF SUMMARY

The present disclosure contemplates various systems and methods for overcoming the above drawbacks accompanying the related art. The present disclosure addresses a need for a diagnostic network architecture that allows app users to aggregate their vehicle diagnostic data and derived vehicle condition information and emissions test results in a common storage area, where it can be accessed, analyzed and acted on by the app user. Preferably such aggregation may be implemented, on an ongoing basis, independent of any user interaction with the app user interface. User activity may be limited to providing an instruction to obtain an emissions test (or more generally a diagnostic information scan) and selecting a nearby emissions test provider or other diagnostic service provider that provides a diagnostic data inspection (preferably free of charge). The instruction of the user to obtain an emissions test may be in response to a notification from the app that the vehicle is due for an emissions test. The test may include an evaluation of readiness indicators of the vehicle.

In one embodiment, the emissions test provider may transmit the diagnostic data or a portion thereof to a server associated with the app, which may then forward it to the relevant government authority for an official emissions test result. In this iteration, the server associated with the app may act as part of an emissions test data exchange as defined by the relevant government authority, e.g., as a data acquisition server of DEQ's Remote OBD system in the state of Oregon (or comparable role in another jurisdiction).

Alternatively, the emissions test provider may transmit the diagnostic data collected from the vehicle to the server associated with the app in parallel with transmitting the same diagnostic data to the relevant government authority. In this iteration, the server associated with the app may act as an overlay that functions on top of existing infrastructure for completing an emissions test (with the emissions test provider acting as the data acquisition server or comparable role). In either case, the server associated with the app can then use the vehicle identification number (VIN) included in the diagnostic data to retrieve the emissions test result from the government authority on behalf of the app user, which may be presented to the user with a link to initiate payment to receive a certification. Since the server associated with the app get the diagnostic data of the vehicle from the emissions test provider, the server is able to offer upsells to the vehicle owner, such as predictive diagnostics, parts data, tampering analysis, etc.

In other iterations, such as where the emissions test provider transmits the diagnostic data only to the relevant government authority and not to the server associated with the app, the server may instead receive the VIN directly from the app (or from a user profile associated with the app user) in response to a user instruction to obtain the emissions test result. In this case, even without receiving diagnostic data from the emissions test provider, the server associated with the app can still provide predictive diagnostics that may be based on the mileage included as part of the emissions test result, for example. The contemplated system can also provide an emissions test management function for the convenience of the user by notifying the user of the need for the emissions test, directing the user to an emissions test provider, and retrieving the emissions test result for the user, all within the same app.

From the perspective of the emissions test provider, who may be a repair service provider or an auto parts store, for example, the contemplated system may constitute a new range of backend services for a diagnostic tool or kiosk that is already used on site by the emissions test provider. For example, an auto parts store might already provide its customers with access to a scan tool, kiosk, or other diagnostic tool that may be operated on the premises of the auto parts store by a customer or employee to collect diagnostic data from the customer's vehicle. The collected diagnostic data may be uploaded to a server operated by a different business entity (such as the maker of the diagnostic tool) that operates proprietary diagnostic databases and algorithms to generate a diagnostic report based on the collected diagnostic data. In general, such a report may be of great value to the customer as well as to the auto parts store since, in addition to providing useful information to customers, the report may further direct the customer to services and products (such as auto parts) that are sold on site, increasing sales opportunities and a provider of parts as may be indicated by the emissions test result or otherwise indicated by the vehicle data package.

Advantageously, it is envisioned that the system and methods described herein may be provided by the same business entity that operates such diagnostic databases and algorithms on behalf of the auto parts store (and that typically provides the auto parts store with the scan tools, kiosks, or other diagnostic tools). By further providing the emissions test functionality of the system described herein, the same business entity that provides the backend diagnostics support generally may now additionally provide backend support to allow emissions testing to be done on site at the auto parts store (with the auto parts store thus becoming an emissions test provider in accordance with some embodiments of the present disclosure). In this way, the system may represent a potentially huge increase in the customer base of any given auto parts store, repair service provider, or other business that operates a diagnostic tool, since the new customers would include anyone who needs an emissions test, which is often required by regulation.

In addition to the management function described above, the contemplated system may provide an additional or alternative function of independently evaluating the diagnostic data received from the emissions test provider. In the case of a regulatory jurisdiction such as Oregon that allows for an OBD-only emissions test, the server associated with the app may apply the same pass/fail logic as the government authority, yielding an expected emissions test result that has a high probability of matching the official test result and potentially offering additional diagnostic information to the vehicle owner. By using the app, the vehicle owner may have access to this expected emissions test result more quickly (e.g., immediately). Meanwhile, in the case of a regulatory jurisdiction that additionally requires non-OBD components of the emissions test (such as a visual inspection and/or tailpipe exhaust analysis), the expected emissions test result derived based solely on OBD data may still have predictive value for the vehicle owner. The system effectively gives the vehicle owner the option of getting a quicker, less expensive, more convenient OBD-only emissions "pretest," and the app will let the vehicle owner know whether the OBD data indicates a likely pass or fail of the full test (e.g., whether the OBD component of the test will likely pass or fail). In the case of a predicted fail, the vehicle owner will then have the opportunity to take corrective measures to avoid an official fail result. For example, the app can direct the vehicle owner to nearby repair shops and auto parts stores that are capable of addressing the defect that resulted in the predicted fail, including the same repair shop or auto parts store that collected the data (the emissions test provider). In a case where the predicted fail is due to one or more incomplete readiness indicators, the app can advise the vehicle owner as to how to overcome the incomplete readiness indicator, for example, by displaying a recommended number of miles that should be driven, in some cases at a specified speed, before attempting to get the emissions test or another pretest. In this way, the vehicle owner can avoid the inconvenience and expense of getting a full emissions test when the vehicle is likely to fail even considering only the OBD data.

In further iterations, the contemplated system may act in an advisory capacity to the state or other government authority that determines the official emissions test result for the vehicle. Using the same diagnostic data received from the emissions test provider, the server associated with the app this time may analyze the diagnostic data to check i) the identity of the vehicle and/or ii) whether any relevant modifications have been made to the onboard emissions control system of the vehicle (or any other modifications that may call into question the safety of the vehicle). Analysis may be based on a deep dive of the OBD data that compares, for example, identification numbers of controllers, modules, and other components of the vehicle to expected identification numbers of components that should be installed on the vehicle. The analysis can take into account the expected initial component makeup of the vehicle across multiple models (based on year, make model, trim as determined from the VIN) as well as past data stored by the system for that exact vehicle, which may include records of parts installed and services performed on the vehicle. As described in detail herein, any and all such event data may be stored in association with a user profile of the app user, which may be indexed by the VIN.

In iterations where the system only analyzes diagnostic data of vehicles that are associated with registered users of the app, the server's right to access private data for all of the above purposes may be governed by contractual authorization given by the user when registering with the app. In such cases, if the server is responsible for forwarding the diagnostic data to the government authority, the server may simply forward any diagnostic data of non-app users without analyzing it. In this regard, it is noted that the server may be a separate server from the server that communicates with the app or with third-party providers of repair services, auto parts, and roadside assistance, allowing the server responsible for handling diagnostic data of non-app users to be secured and/or isolated as needed in accordance with privacy regulations. Such a separate server may also be responsible for managing communication and data protocols of a variety of disparate emissions test jurisdictions, for example, with the server thus have an adapter functionality to allow for the interfacing of the system with the existing (and evolving) technologies and regulations of each jurisdiction. If the server instead only receives a parallel copy of the diagnostic data that is being transmitted to the government authority by the emissions test provider, then the contemplated system may simply dump any received diagnostic data of non-app users. In either case, it might only be the diagnostic data of app users that is analyzed by the server. It is also contemplated, however, that the system may be used in an advisory capacity for the benefit of government authorities for all emissions tests and other vehicle safety-related regulation compliance, irrespective of whether the vehicle owner uses the app. In this case, it is contemplated that an anonymized ("scrubbed") dataset (e.g., with a predetermined number of VIN digits removed) may be used by the server to perform a portion of the analysis for increased security and privacy. In these ways, it is contemplated that the system can serve various advisory functions for relevant government authorities in charge of emissions tests and other vehicle regulatory compliance, including confirming vehicle identity and detecting tampering, without implicating privacy concerns of non-app vehicle owners.

In other iterations, the server may only gain access to the OBD data after the completion of the emissions test, or in some cases the server may never gain access to the OBD data but may only receive a copy of a state-issued report including the emissions test result. In these scenarios as well, the contemplated system can benefit the vehicle owner by deriving detailed diagnostic information including a likely fix, lists of needed parts, etc., based on the OBD data, on the substance of the state-issued report, or both, with the available data depending on the particular emissions test jurisdiction. The detailed diagnostic information may then be provided to the vehicle owner within the app and/or to the auto parts store or other emissions test provider where the OBD data was obtained from the vehicle.

Whether the system is used within or outside the context of an emissions test or other state-mandated test or servicing, the diagnostic service provider may, in general, upload the diagnostic information to the server associated with the app, which, in addition to returning the diagnostic report to the providing diagnostic service provider, may also detect diagnostic data/information associated with a registered vehicle and route the data/information to the user, or to a storage location associated with the user. It is an intended result of the disclosed subject matter to enable the generation of a diagnostic report for a vehicle that doesn't necessarily have a dongle or other data access and transfer device, where the report may essentially replicate a report generated for a vehicle having an associated data collecting dongle or other device.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 2A shows a sequence of screenshots of the mobile application in relation to getting an emissions test scan;

DETAILED DESCRIPTION

The present disclosure encompasses various embodiments of systems and methods for mobile application-based vehicle diagnostics. The detailed description set forth below in connection with the appended drawings is intended as a description of several currently contemplated embodiments and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
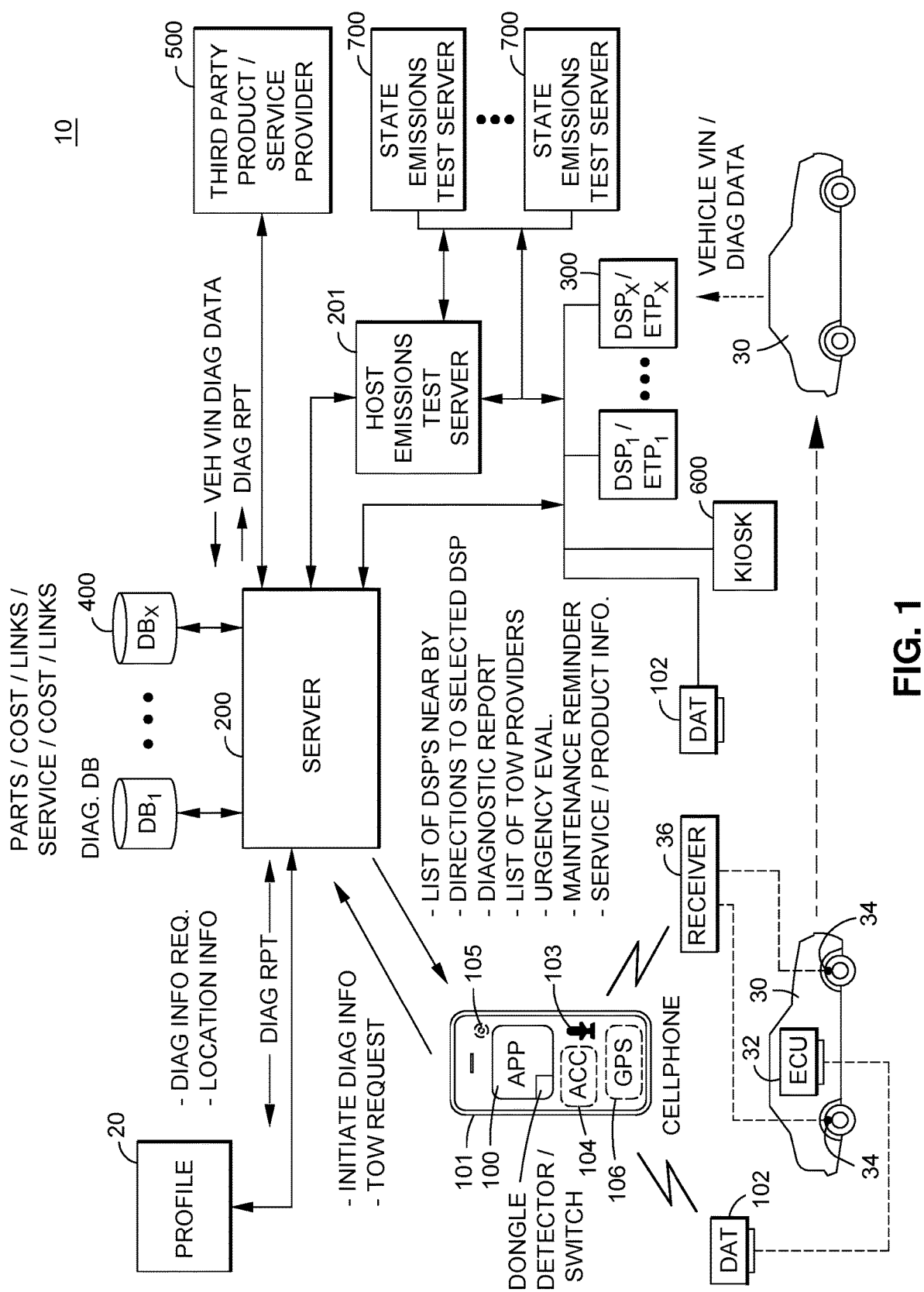
FIG. 1 shows a system for selective vehicle data retrieval according to an embodiment of the present disclosure.

FIG. 1 shows an exemplary system 10 for selective vehicle data retrieval according to an embodiment of the present disclosure. A vehicle owner may install a mobile application ("app") 100 on his or her smartphone or other mobile communication device 101 and establish a user profile 20 including a vehicle identification number (VIN) associated with the vehicle owner's vehicle 30. A license plate number may also be included in the user profile 20. The app 100 may serve as the vehicle owner's gateway for all automotive needs, whether the vehicle owner wishes to diagnose the vehicle 30 (e.g. either to address some symptom or as a precaution before a road trip, for example), service the vehicle 30, review and transact with past vehicle condition information and service reports, or get immediate assistance (such as when the vehicle 30 breaks down). To this end, a server 200 in communication with the mobile communication device 101 may receive various requests from the app 100 and respond by providing targeted assistance, recommendations, and other information to the app 100 to meet the vehicle owner's particular need.

In order to provide such information targeted to the particular vehicle 30 and vehicle owner, the server 200 may manage the vehicle owner's user profile 20, which may be stored in a database of user profiles 20 for many different users of the system 10, for example. Each time the vehicle 30 is scanned for diagnostic data, whether it is done by the vehicle owner's own data acquisition and transfer device (DAT) 102 or by a scan tool belonging to a third-party diagnostic service provider 300 ($DSP_1, \ldots, DSP_X$), the retrieved diagnostic data may be uploaded to the server 200 for diagnostic analysis using one or more diagnostic databases 400 ($DB_1, \ldots, DB_X$). (In the case of emissions testing, the diagnostic service provider 300 may also be referred to as an emissions test provider 300 (ETP).) A diagnosis, defect, most likely fix, or other vehicle condition information may thus be returned to the vehicle owner or the third-party diagnostic service provider 300. However, unlike in the case of conventional diagnostic systems, the VIN included in the uploaded diagnostic data may further be used to associate the event with the user profile 20 that includes the same VIN. In this way, the server 200 may leverage the conventional processes of existing diagnostic service providers to accumulate individualized information in each user profile 20, irrespective of where or by what means the vehicle 30 was diagnosed.

The individualized information stored in the user profile 20 may include the vehicle condition information that has been derived based on diagnostic data retrieved from the vehicle 30. Thus, even where a third-party diagnostic service provider 300 has performed the diagnostic scan, one who may be a completely different business entity than the provider of the app 100, the vehicle owner may have full access to the resulting vehicle condition information (and the underlying diagnostic data itself) via the app 100, just as if the vehicle owner had performed the scan himself or herself. Such vehicle condition information derived from a most recent scan or from a past scan in relation to the vehicle 30 may be made available to the user via the app 100 on the screen of the mobile communication device 101, either automatically or on demand.

Upon reviewing vehicle condition information that indicates some defect in the vehicle 30, the vehicle owner may further use the app 100 to request individualized recommendations for appropriate service, parts, or roadside assistance. In this regard, the app 100 may suggest one or more third party repair service providers, auto parts providers, and/or roadside assistance providers (collectively third-party providers 500) based on the vehicle condition information and on the particular vehicle 30 as well as on current location data associated with the mobile communication device 101 or the vehicle 30. Because the app 100 has access to the user profile 20 (e.g. via the server 200), which may contain historical data associated with the vehicle 30 including vehicle owner preferences, the third-party providers 500 may in some cases be selected or ranked in an individualized manner not just for the particular defect and year/make/mode/trim but for the exact vehicle 30 in question and its owner. For example, the app 100 might prioritize third-party providers 500 that the vehicle owner has gone to (and has had positive experiences with) in the past. The app 100 may present a list of third-party providers 500 to the user, from which the vehicle owner may make a selection (e.g. based on cost, distance, etc.). The app 100 may then direct the vehicle owner to the selected third-party provider 500 (or provide contact information in the case of a roadside assistance provider) so that the vehicle owner can get the needed service, parts or roadside assistance.

Figure 2:
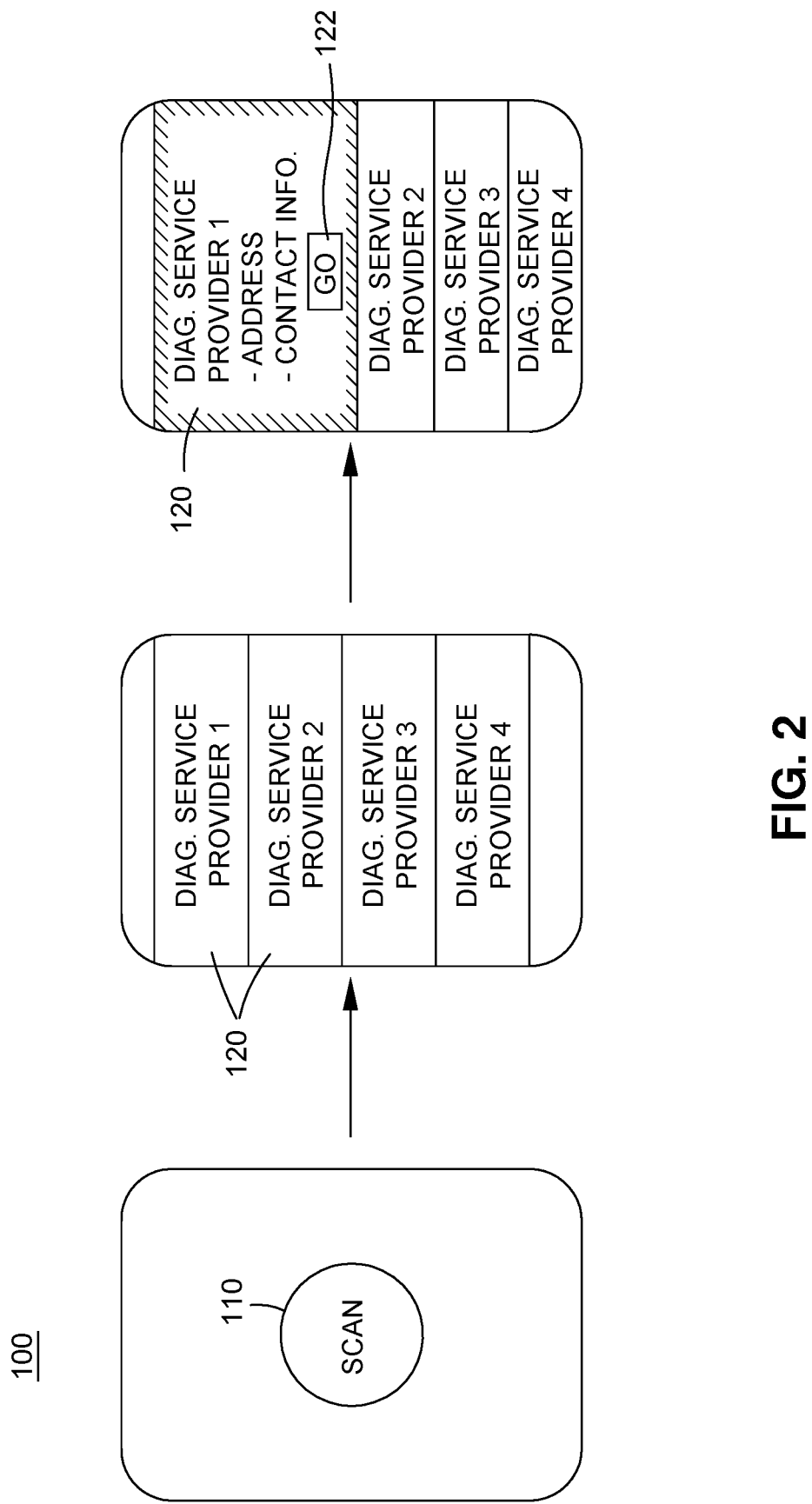
FIG. 2 shows a sequence of screenshots of a mobile application according to an embodiment of the present disclosure in relation to obtaining vehicle condition information.

FIG. 2 shows a sequence of screenshots of the app 100 in relation to obtaining vehicle condition information using the system 10. In the first (leftmost) view, the app 100 displays a scan button 110. As an example, consider a vehicle owner who is far from home, driving across country on a road trip. The vehicle owner begins to notice a recurring, unfamiliar sound coming from the engine (or, as another example, the check engine light becomes illuminated). Since the vehicle owner will soon be entering less populated areas where service options are fewer and farther between, the vehicle owner decides it would be wise to get the issue checked out sooner rather than later. The vehicle owner does not own a dongle or other DAT or scan tool but has the app 100 installed on his or her smartphone. Pulling over for a moment, the vehicle owner opens up the app 100 and taps the scan button 110.

In response to the vehicle owner's interaction with the scan button 110, the app 100 transitions to the second (center) view of FIG. 2, displaying a list of items 120, each one corresponding to a nearby diagnostic service provider 300 (see FIG. 1). Since the app 100 has already determined a geolocation of the vehicle owner's smartphone (either before or after the scan button 110 was tapped), the listed items 120 may represent those diagnostic service providers 300 that are nearby, e.g. those having a geolocation within a threshold distance of the geolocation of the smartphone or within a threshold travel time of the geolocation of the smartphone (or other locational relationship between the geolocation of the provider 300 and the geolocation of the smartphone). Since the system 10 is also aware of the vehicle owner's particular vehicle 30 and the vehicle owner's personal preferences/history (as may all be included in the vehicle owner's user profile 20), it can be ensured that the listed diagnostic service providers 300 are all viable/preferred diagnostic service providers 300 for scanning the vehicle 30.

The vehicle owner reviews his or her options and taps the item 120 corresponding to his or her choice of diagnostic service provider 300, causing the app 100 to transition to the third (rightmost) view of FIG. 2, where additional details of the selected diagnostic service provider 300 may be displayed in an expanded version of the item 120. In the illustrated example, the expanded view shows address and contact information for the selected diagnostic service provider 300, whereas the collapsed view only showed the name of each diagnostic service provider 300 (though the list itself may provide information by ranking the diagnostic service providers 300 by distance, travel time, or other criteria, for example). With such an implementation, it is contemplated that the vehicle owner may need more information to make a decision and might expand and collapse several of the list items 120 before arriving at a decision. In general, the particular details that are displayed in the expanded and collapsed views may vary from implementation to implementation (or according to user preference settings), and in some cases there may be only a single view that includes all of the details for each list item 120 (possibly with links to external websites associated with each diagnostic service provider 300 if more information is needed). A button 122 may be provided in association with each item 120 (shown in FIG. 2 in the expanded/detail view only), which may initiate a navigation routine (e.g. via third-party application) to direct the vehicle owner from the current geolocation of the smartphone to the geolocation of the selected diagnostic service provider 300.

The vehicle owner is now on his or her way to a nearby diagnostic service provider 300, such as a service center, parts store, drive-up kiosk (e.g. at a gas station or other vehicle service center or an auto parts store), or anywhere else that may have a scan tool or other means of connecting to the diagnostic port of the vehicle 30 and running a scan. The vehicle owner is happy to have been able to find a suitable diagnostic service provider 300 in a totally unfamiliar area, especially one that has been selected in accordance with the vehicle owner's own vehicle 30 and preferences. It should be noted that, in some cases, the diagnostic service provider 300 may be an individual owner of a scan tool who comes to the vehicle owner and performs the scan wherever the vehicle owner is located. In such a case, the button 122 associated with that particular diagnostic service provider 300 may instead initiate a call (e.g. via the smartphone's native calling functionality) or book an appointment (e.g. via a third-party app or weblink) with the diagnostic service provider 300, rather than giving directions.

Continuing with the above example, the vehicle owner has now had the scan done, which may typically and preferably be free of charge. In particular, using a scan tool or other means, the diagnostic service provider 300 has retrieved diagnostic data from the vehicle 30, which may include diagnostic trouble codes (DTC), vehicle sensor data, freeze frame data, and live data, for example, in addition to the VIN of the vehicle 30. The diagnostic service provider 300 uploads the retrieved diagnostic data to the server 200, and the server 200 derives vehicle condition information from the uploaded diagnostic data by comparing the uploaded diagnostic data with data stored in the diagnostic database(s) 400. Exemplary diagnostic methods, including the use of such diagnostic data to arrive at a most likely root cause and repair solution, are described in the following U.S. patents and patent application publications, each of which is owned by Innova Electronics Corporation of Irvine, Calif. ("Innova"): U.S. Pat. No. 6,807,469, entitled AUTO DIAGNOSTIC METHOD AND DEVICE, U.S. Pat. No. 6,925,368, entitled AUTO DIAGNOSTIC METHOD AND DEVICE, U.S. Pat. No. 7,620,484, entitled AUTOMOTIVE MOBILE DIAGNOSTICS, U.S. Pat. No. 7,734,390, entitled USE OF AUTOMOTIVE DIAGNOSTICS CONSOLE TO DIAGNOSE VEHICLE, U.S. Pat. No. 8,068,951, entitled VEHICLE DIAGNOSTIC SYSTEM, U.S. Pat. No. 8,019,503, entitled AUTOMOTIVE DIAGNOSTIC AND REMEDIAL PROCESS, U.S. Pat. No. 8,370,018, entitled AUTOMOTIVE DIAGNOSTIC PROCESS, U.S. Pat. Nos. 8,825,270 and 9,761,062, both entitled METHOD AND APPARATUS FOR INDICATING AN AUTOMOTIVE DIAGNOSTIC URGENCY, U.S. Pat. No. 8,909,416, entitled HANDHELD SCAN TOOL WITH FIXED SOLUTION CAPABILITY, U.S. Pat. No. 9,026,400, entitled DIAGNOSTIC PROCESS FOR HOME ELECTRONIC DEVICES, U.S. Pat. No. 9,177,428, entitled PREDICTIVE DIAGNOSTIC METHOD, U.S. Pat. No. 9,646,432, entitled HAND HELD DATA RETRIEVAL DEVICE WITH FIXED SOLUTION CAPABILITY, U.S. Pat. No. 9,824,507, entitled MOBILE DEVICE BASED VEHICLE DIAGNOSTIC SYSTEM, U.S. Pat. No. 9,892,568, entitled METHOD AND SYSTEM FOR DETERMINING THE LIKELY OPERATING COST FOR A PARTICULAR TYPE OF VEHICLE OVER A DEFINED PERIOD, U.S. Pat. No. 10,643,403, entitled PREDICTIVE DIAGNOSTIC METHOD AND SYSTEM, U.S. Patent Application Pub. No. 2013/0297143, entitled METHOD OF PROCESSING VEHICLE DIAGNOSTIC DATA, U.S. Patent Application Pub. No. 2019/0304208, entitled SYSTEM AND METHOD FOR PROACTIVE VEHICLE DIAGNOSIS AND OPERATIONAL ALERT, U.S. Patent Application Pub. No. 2019/0304213, entitled SYSTEM AND METHOD FOR PROACTIVE VEHICLE DIAGNOSIS AND OPERATIONAL ALERT, U.S. Patent Application Pub. No. 2021/0279978, entitled KIOSK BASED VEHICLE DIAGNOSTIC SYSTEM, and U.S. patent application Ser. No. 17/170,366, filed Feb. 8, 2021 and entitled AUTOMOTIVE DIAGNOSTIC KIOSK HAVING AUTONOMOUS FUNCTIONALITY, the entire contents of each of which is expressly incorporated herein by reference. It is also contemplated that the scan tool or other diagnostic tool used by the diagnostic service provider 300 may be operable to generate a barcode such as a two-dimensional barcode (e.g., a QR code) encoding the retrieved diagnostic data. In this case, the mobile application 100 may be operable to decode the diagnostic data based on an image of the barcode captured by a camera of the mobile communication device 101. By the same token, the diagnostic service provider 300 may use such a barcode to transfer diagnostic data from one device to another (e.g., from a kiosk screen to a tablet or other point of sale device) as part of the diagnostic process and/or to auto-populate a digital shopping cart with relevant auto parts and service items, as well as in some cases to facilitate establishment of an operative connection between two devices (e.g., between a kiosk and a handheld communication device) in response to scanning the barcode. Examples of such functionality are described in U.S. Patent Application Pub. No. 2021/0279978, incorporated by reference above, as well as in Innova's U.S. patent application Ser. No. 17/573,205, filed Jan. 11, 2022, and U.S. patent application Ser. No. 17/666,115, filed Feb. 7, 2022, both owned by Innova Electronics Corporation and entitled DIAGNOSTIC TOOL WITH QR CODE GENERATING CAPABILITY, the entire contents of each of which is expressly incorporated herein by reference.

Figure 3:
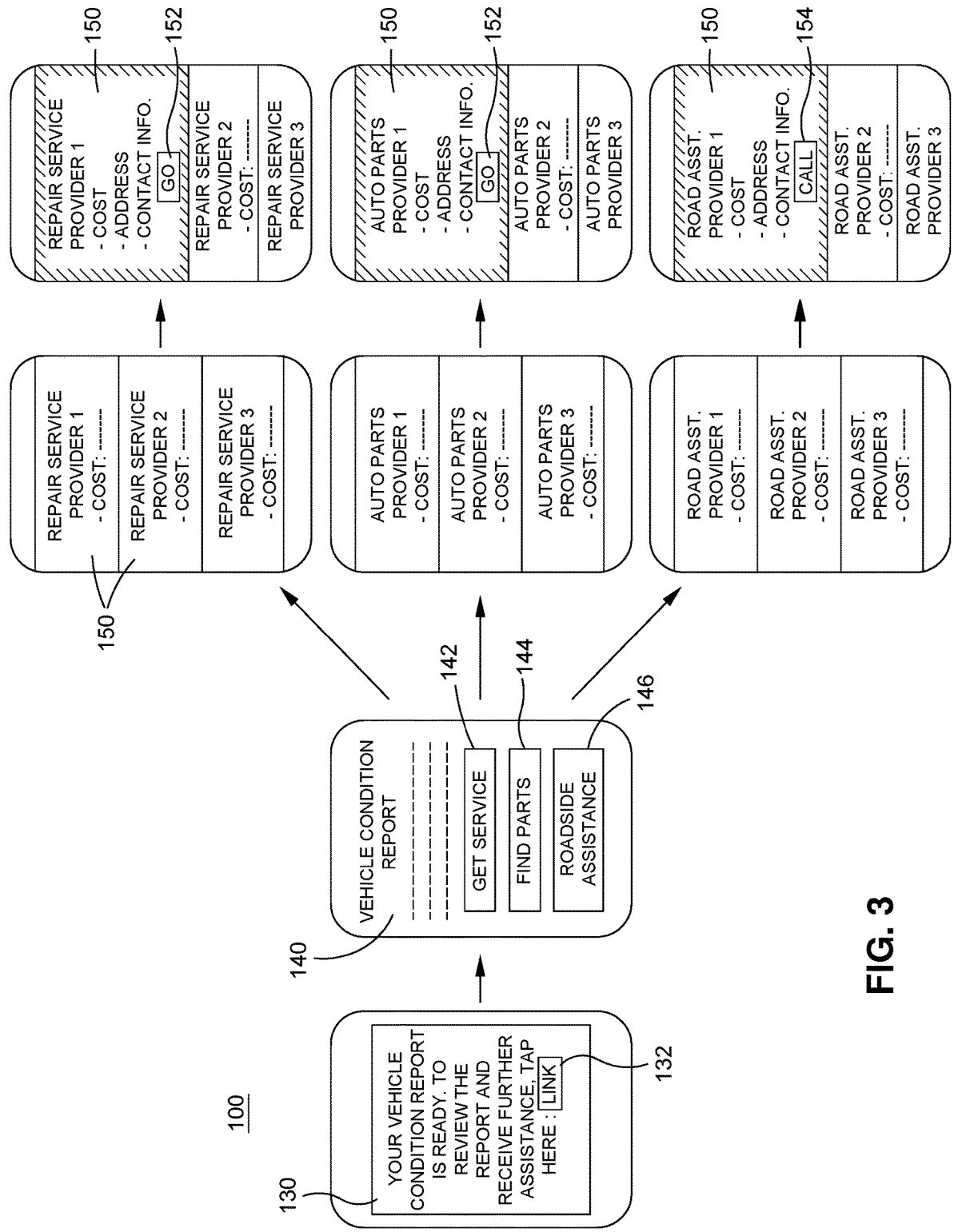
FIG. 3 shows a sequence of screenshots of the mobile application in relation to viewing vehicle condition information and requesting further assistance.

FIG. 3 shows a sequence of screenshots of the app 100 in relation to viewing vehicle condition information and requesting further assistance. Having been derived by the server 200 as described above, the vehicle condition information may be provided to the diagnostic service provider 300 according to typical diagnostic service process flows, where the diagnostic service provider 300 may use the vehicle condition information to inform the vehicle owner of a defect and/or recommend services. However, according to the exemplary system 10, the same vehicle condition information may also be provided to the vehicle owner via the app 100 in a parallel process that places the vehicle owner directly in control of the information. In the first (leftmost) view of FIG. 3, a notification 130 has been received on the vehicle owner's smartphone, which may be presented within the app 100, as a native notification of the smartphone operating system (e.g. a lock screen notification), or as a text message (e.g. SMS), for example. In the illustrated example, the notification 130 says, "Your vehicle condition report is ready. To review the report and receive further assistance, tap here:" followed by a link 132. Continuing with our example from above, the vehicle owner on the road trip may have just completed the scan at the diagnostic service provider 300 selected using the app 100 (see FIG. 2). Moments later, while he or she is still at the location of the diagnostic service provider 300 (though not necessarily so), the vehicle owner receives the notification 130 and taps the link 132.

In response to the vehicle owner's interaction with the link 132, the app 100 may display the received vehicle condition information on the vehicle owner's smartphone in the form of a vehicle condition report 140 as shown in the second (center-left) view of FIG. 3. In a case where the notification 130 is presented on the smartphone outside the app 100, the link 132 may deep link directly to the vehicle condition report 140 within the app 100. The vehicle condition information displayed in the vehicle condition report 140 may include, for example, the retrieved vehicle data, including the VIN, digital trouble codes, freeze frame data, live data, and other sensor data and identification of a most likely defect and an associated diagnostic solution derived from the diagnostic data that was retrieved from the vehicle 30. In some cases, the report may also include an estimated cost to repair the defect, along with the underlying diagnostic data itself. In reviewing the vehicle condition report 140, the vehicle owner of the above example learns that the engine's head gasket is the likely cause of the engine noise and should therefore be replaced. To assist the vehicle owner in dealing with this or any other issue indicated by the vehicle condition information, the app 100 may present to the user one or more buttons 142, 144, 146 in association with the vehicle condition report 140. Continuing with the example of the bad head gasket, the vehicle owner decides to seek a repair service to replace the head gasket and thus fix the defect. Therefore, the vehicle owner taps the "get service" button 142.

In response to the vehicle owner's interaction with the "get service" button 142, the app 100 transitions to the third (center-right) view of FIG. 3, following the uppermost of the three arrows from the second (center-left) view. The app 100 displays a list of items 150 similar to the items 120 of FIG. 2, only in this case each item 150 to a nearby repair service provider 500 (see FIG. 1) rather than a diagnostic service provider 300. From here, the vehicle owner selects between the listed repair service providers 500, possibly expanding one or more of the list items 150 for additional details as shown in the fourth (rightmost) view of FIG. 3. Unlike the diagnostic service described above, the repair service typically has a cost associated with it, so it is contemplated that each list item 150 may include a display of the cost to repair the defect, which may vary from service provider to service provider. When the vehicle owner has made his or her decision, he or she may tap the button 152 ("GO") to be directed to the selected repair service provider 500 in the same way as described above in the case of the diagnostic service provider 300. It is noted that the app 100 will use the new current geolocation of the smartphone or vehicle 30, both for compiling the list of repair service providers 500 and for directing the vehicle owner to the selected repair service provider 500, as the geolocation will often be different from what it was at the time of the vehicle owner's original instruction to initiate the scan. Because the app 100 compiles the list of repair service providers 500 according to the vehicle condition information, the particular vehicle 30, and any vehicle owner preferences, all of which may be known from the vehicle condition information and the user profile 20, the vehicle owner has the reassurance that the repair service provider 500 he or she selected is capable of fixing the defect at hand. The vehicle owner may confidently rely on the repair service provider 500 to resolve the issue (and get back to the road trip), even when in an unfamiliar area.

If the vehicle owner had been interested in replacing the head gasket by himself or herself, or wants to compare the cost of parts from different sources, the vehicle owner may have instead tapped the "find parts" button 144, in response to which the app 100 would have equivalently displayed a list of items 150 corresponding to nearby auto parts providers 500. Each auto parts provider 500 listed by the app 100 would have already been determined to have the needed part based on the vehicle condition report 140 and the particular vehicle 30. Likewise, if the vehicle owner had decided that a tow was preferable, the vehicle owner may have instead tapped the "roadside assistance" button 146. In this case, the app 100 would have displayed a list of nearby roadside assistance providers 500 capable of providing roadside assistance in relation to the particular defect indicated by the vehicle condition report 140 (and for the particular vehicle 30). In some cases, the vehicle condition information included in the vehicle condition report 140 may include an urgency level associated with the vehicle condition information for a specific vehicle. The urgency level may be displayed to the user to assist the user in choosing how, when, and where to repair the defect and, for example, whether to request roadside assistance 146. It is contemplated that the urgency level may indicate, for example, whether the vehicle 30 should be driven in its current state, such that the app 100 may advise the vehicle owner to request roadside assistance using the "roadside assistance" button 146 rather than finding and driving to a repair service provider 500 using the "get service" button 142. Conversely, for non-urgent defects, the vehicle condition report 140 may recommend that a DIYer simply order the needed part using the "find parts" button 144, rather than driving to an auto parts store.

Figure 4:
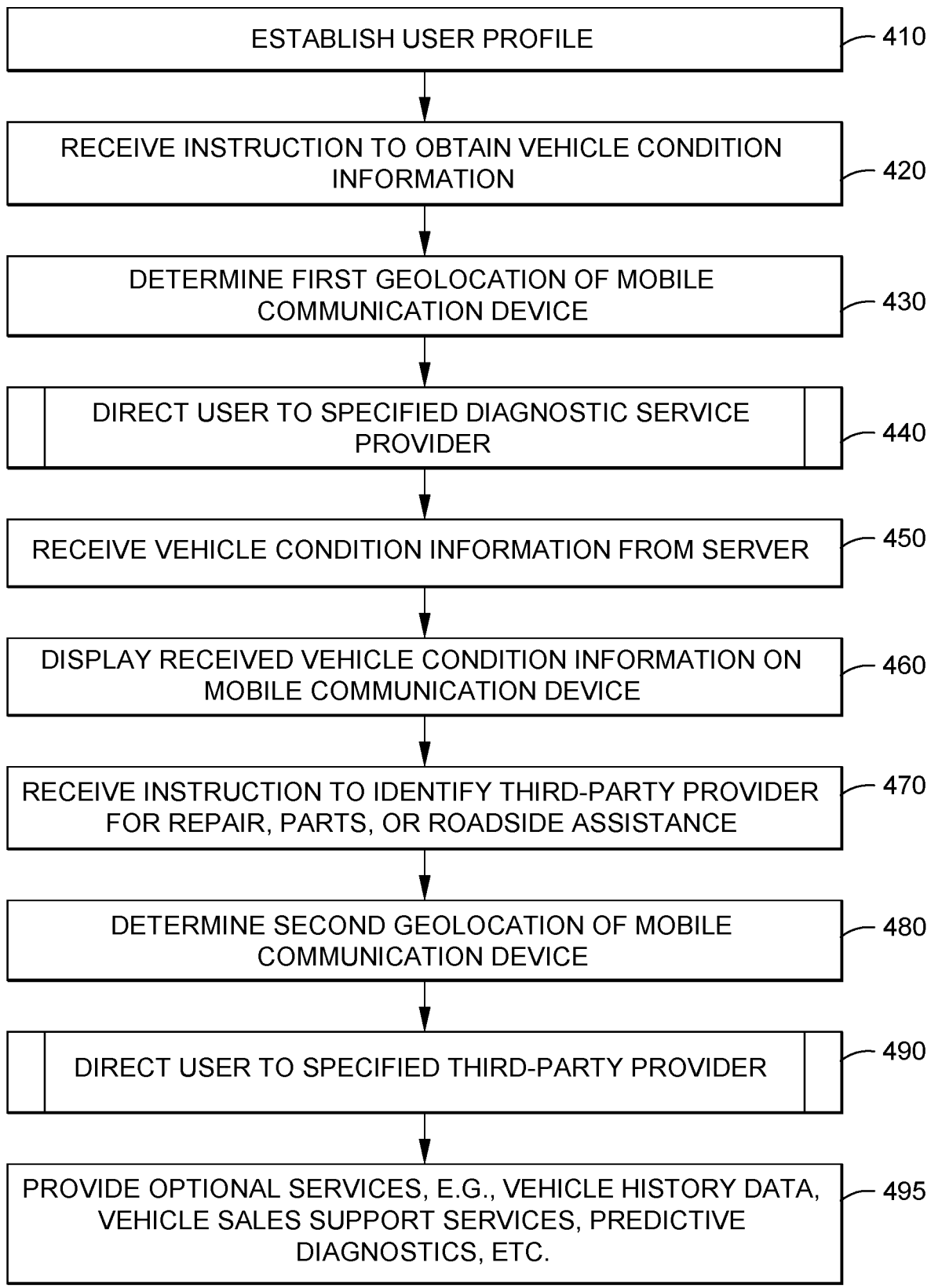
FIG. 4 shows an example operational flow according to an embodiment of the present disclosure.
Figure 5:
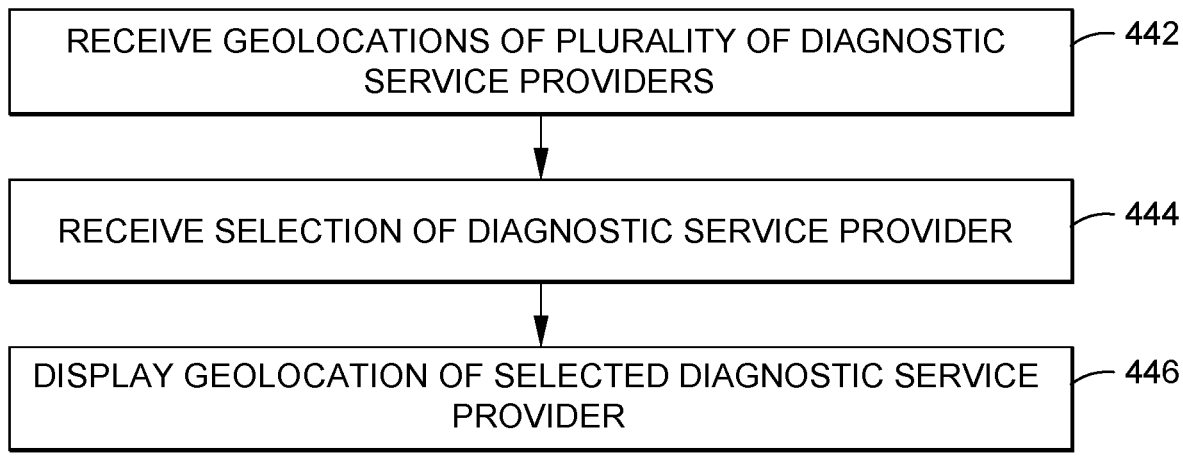
FIG. 5 shows an example sub-operational flow of step 440 in FIG. 4.
Figure 6:
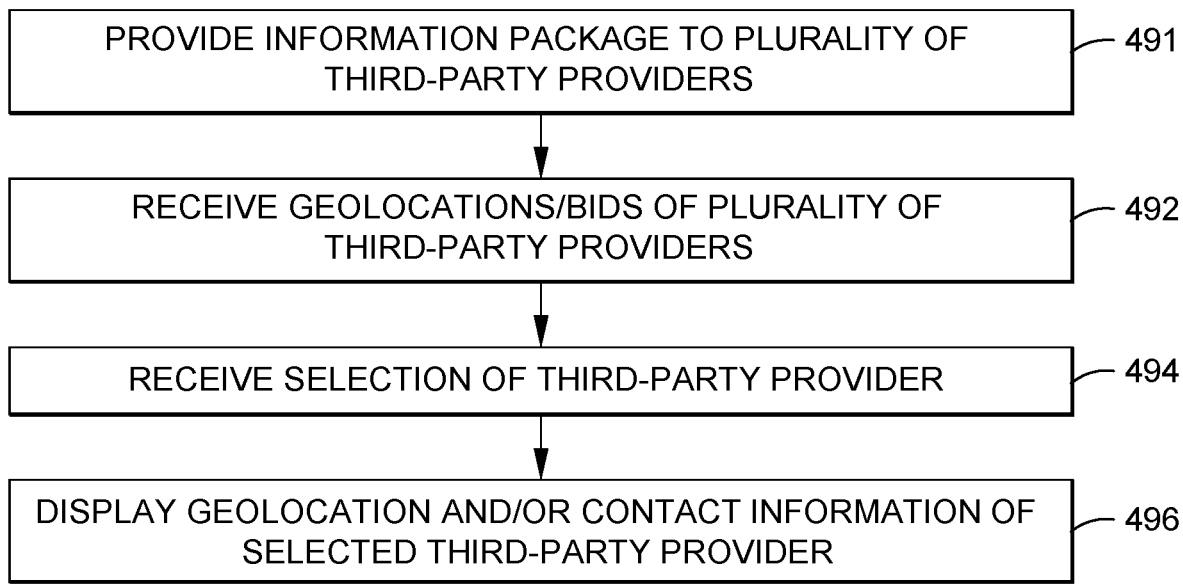
FIG. 6 shows an example sub-operational flow of step 490 in FIG. 4.

FIG. 4 shows an example operational flow according to an embodiment of the present disclosure, with FIGS. 5 and 6 showing example sub-operational flows of steps 440 and 490, respectively. The operational flow of FIGS. 4-6 may be performed, in whole or in part, by one or more elements of the system 10 shown and described in relation to FIGS. 1-3. In particular, the operational flow may be performed by the mobile application 100 installed on a smartphone or other mobile communication device 101 belonging to an owner of a vehicle 30. The operational flow may begin with establishing a user profile associated with a user of the mobile communication device 101, namely the vehicle owner (step 410). The app 100 may establish the user profile, for example, by prompting a new user to input certain information such as personal and vehicle identifying information (e.g. a VIN associated with a registered vehicle operated by the user), contact information such as an SMS-enabled phone number for receiving notifications, secure login credentials, etc. For the sake of convenience, the app 100 may allow the user to input the VIN by optically scanning a VIN bar code using the mobile communication device 101. Once all the information is input, the app 100 may communicate with the server 200 (see FIG. 1) to create and store a user profile 20 associated with the new user and the vehicle 30. As described above, the user profile 20 will grow over time to include data from any and all automotive diagnostic and service events associated with the vehicle 30, regardless of where or how the data is obtained. This may be achieved by virtue of the association of the user profile 20 with the VIN, which may thus be matched by the server 200 with incoming diagnostic data from disparate sources as described above.

With the user profile 20 having been established, the vehicle owner may begin to use the app 100 as described in relation to FIGS. 1-3. In particular, the operational flow of FIG. 4 may continue with receiving, at the mobile communication device 101, an instruction to obtain vehicle condition information (step 420). In the examples thus far described, the instruction is received via user input to the mobile communication device 101, such as by tapping a scan button 110 (see FIG. 2). However, the instruction may also be received remotely (e.g. by wireless communication) and/or automatically generated in response to a current state of the vehicle 30 as described in more detail below. At any time proximate to the receipt of the instruction to obtain the vehicle condition information (whether before or after), the operational flow may further include determining a first geolocation of the mobile communication device 101 (step 430), e.g., using cellular data and/or a GPS module 106 included in the mobile communication device 101. This can be done at all times (e.g. periodically) or may be in response to the instruction, for example, as long as the geolocation is determined at a point in time near enough to be reliably used by the app 100.

In response to the instruction to obtain the vehicle condition information, and based on the first geolocation, the operational flow may continue with directing the user of the mobile communication device 101 to a specified diagnostic service provider having a capability to retrieve diagnostic data (including the VIN) from the vehicle 30 and upload it to the server 300 (step 440). In this regard, as represented by the sub-operational flow of FIG. 5, the app 100 may receive geolocations of a plurality of diagnostic service providers 300 in relation to the first geolocation of the mobile communication device 101 (step 442) and display a list of nearby diagnostic service providers 300 as described in relation to FIG. 2 (e.g. those diagnostic service providers 300 having a geolocation within a threshold distance or travel time as described above). The app 100 may then receive a selection of one of the diagnostic service providers 300 via user input to the mobile communication device 101 (step 444), such as by the user expanding one of the list items 120 as shown in FIG. 2. The app 100 may then display the geolocation of the selected diagnostic service provider 300 as shown in the right-most view of FIG. 2 ("ADDRESS") (step 446), thus directing the user to the selected diagnostic service provider 300. The user may further request navigation assistance using the button 122 if desired.

Once the vehicle 30 has been scanned (e.g. by the selected diagnostic service provider 300 who may be a different business entity than the provider of the app 100) and diagnostic data has thus been retrieved and uploaded to the server 200, the operational flow of FIG. 4 may continue with receiving the derived vehicle condition information from the server 200 (step 450). In particular, as described above, the derived vehicle condition information may be provided to the app 100 on the vehicle owner's own mobile communication device 101 in addition to being provided to the diagnostic service provider 300 who conducted the scan. This may be made possible by taking advantage of the VIN included in the uploaded diagnostic data, which can be detected from the vehicle data by the server or other processor, and matched with the owner of the vehicle 30 by querying stored user profiles 20 for a matching VIN. With the vehicle condition information having been received by the app 100, the app 100 may then display the received vehicle condition information on the mobile communication device 101 (step 460). This may be in the form of the vehicle condition report 140 described above in relation to FIG. 3, for example. As also shown in FIG. 3, it should be noted that steps 450 and 460 may be preceded by the mobile communication device 101 receiving a notification 130 that the vehicle condition information is available for review, at which time the vehicle condition information itself may be at the server 200 and not yet on the mobile communication device 101. The operational flow may then proceed with steps 450 and 460, including the retrieval of the vehicle condition information from the server 200, in response to the user's interaction with the link 132.

The operational flow of FIG. 4 may continue with receiving, at the mobile communication device 101, an instruction to identify a third-party provider for repair, parts, or roadside assistance (step 470). For example, as shown in FIG. 3, the app 100 may receive the instruction via user interaction with one or more buttons 142, 144, 146 that may be displayed in association with the vehicle condition report 140 containing the vehicle condition information. Whether the vehicle owner requests service, parts, or roadside assistance, the app 100 may provide targeted assistance as desired, taking into account the vehicle condition information, the particular vehicle 30, and any preference information of the user that may be included in the user profile 20. To this end, at any time proximate to the receipt of the instruction (whether before or after), the operational flow may further include determining a second geolocation of the mobile communication device 101 (step 480), e.g., using cellular data and/or a GPS module 106 included in the mobile communication device 101. As described above in relation to step 430, the determination of the second geolocation of step 480 can be done at all times (e.g. periodically) or may be in response to the instruction (in this case, in response to the instruction for repair, parts, or roadside assistance), for example, as long as the geolocation is determined at a point in time near enough to be reliably used by the app 100.

In response to the instruction, the operational flow may continue with directing the user of the mobile communication device 101 to a specified third-party provider having a capability to repair a defect indicated by the vehicle condition information, having parts suitable to repair the defect, or having a capability to provide roadside assistance in relation to the defect (step 490). In this regard, as represented by the sub-operational flow of FIG. 6, the app 100 may receive geolocations of a plurality of third-party providers 500 in relation to the second geolocation of the mobile communication device 101 (step 492), which may be different from the first geolocation if the vehicle 30 has moved since the scan was requested. The app 100 may display a list of nearby third-party providers 500 as described in relation to FIG. 3 (e.g. those repair service providers, auto parts providers, and/or roadside assistance service providers having a geolocation within a threshold distance or travel time as described above). The app 100 may then receive a selection of one of the third-party providers 500 via user input to the mobile communication device 101 (step 494), such as by the user expanding one of the list items 150 as shown in FIG. 3. The app 100 may then display the geolocation and/or contact information of the selected third-party provider 500 as shown in the right-most view of FIG. 3 ("ADDRESS," "CONTACT INFO") (step 496), thus directing the user to the selected third-party provider 500. The user may further request navigation assistance using the button 152 or initiate a call using the button 154 as appropriate.

After the operational flow of FIG. 4, once the vehicle owner has transacted with the repair service provider, auto parts provider, or roadside assistance provider (collectively "third-party provider 500") that the app 100 helped find, it is contemplated that a record of the service or purchase may be uploaded by the third-party provider 500 to the server 200, which the server 200 may then store with the user profile 20. The vehicle owner may later want to view transaction information from the service or purchase event, for recordkeeping or possibly to share with another person or business. To this end, upon the vehicle owner's request or in response to some event or at a prearranged time (e.g. as a year-end report), the app 100 may receive, from the server 200 transaction information associated with a repair service rendered by an auto repair service provider, parts purchased by an auto parts provider, or roadside assistance service rendered by a roadside assistance service provider in association with the vehicle 30. The app 100 may display the transaction information on the mobile communication device 101 for use by the vehicle owner.

Along the same lines, it should be noted that the server 200 may continually store vehicle condition information as well as transaction information in the user profile 20. In this way, the user profile 20 may include a long and detailed record of the diagnostic and service events over the lifetime of the vehicle 30. At any time, the vehicle owner may wish to access this past event data, including previous received and viewed vehicle condition information. In this regard, sometime after the operational flow of FIG. 4, the app 100 may receive a user request for past vehicle condition information associated with the user profile 20. In response to the user request, the app 100 may display the vehicle condition information on the mobile communication device 101. For example, the app 100 may retrieve the requested vehicle condition information by accessing the user profile 20, which may be stored at the server 200 or other data storage location, or in some cases locally on the mobile communication device 101. In general, the app 100 may provide additional optional services such as vehicle health report (VHR), vehicle history data, vehicle sales support services, predictive diagnostics, etc. at any point based on the vehicle diagnostic data and/or information stored in the user profile 20 (step 495).

In some situations, a vehicle owner may experience vehicle trouble and may tap the scan button 110 but may not have time to get to a diagnostic service provider 300 to perform the scan. Or, the vehicle owner may intend to go immediately to the diagnostic service provider 300 but may still want more information, such as a rough diagnosis, in the meantime before getting the scan. To accommodate vehicle owners in these situations, the app 100 may further offer symptomatic vehicle diagnostic functionality. For example, upon tapping the scan button 110, the app 100 may, in addition to directing the user to a diagnostic service provider 300 in step 440, further allow the user to input to the mobile communication device 101 information identifying at least one symptom associated with the vehicle 30. For instance, the app may prompt the vehicle owner with a series of questions (e.g. does the car start? is there smoke coming out of the engine?) similar to troubleshooting. The app 100 may further access vehicle identifying information (e.g. the VIN) of the vehicle 30, either by taking it from the user profile 20 (e.g. accessed at the server 200 or on the mobile communication device 101) or receiving it as additional user input to the app 100. Based on the at least one symptom input by the user and the vehicle identifying information, the app 100 may derive symptomatic diagnostic condition information, which may not be as precise as the scan-based vehicle condition information but may still be of some value. The app 100 may display the symptomatic diagnostic condition information on the mobile communication device 101 to inform the vehicle owner. By accessing the user profile 20, the app 100 may further receive past vehicle condition information associated with the user profile 20 and derive the symptomatic diagnostic condition information further taking into account past vehicle condition information. In this way, a more targeted and potentially relevant symptomatic diagnosis can be derived with increased value for the vehicle owner. Further details regarding implementation of a symptomatic diagnostic system may be found, for example, in U.S. Pat. Nos. 9,014,908 and 9,142,066, both entitled MULTI-STAGE DIAGNOSTIC SYSTEM AND METHOD, the entire contents of each of which is expressly incorporated herein by reference.

As illustrated by the above examples, the disclosed system 10 makes it possible for a vehicle owner to obtain and accumulate vehicle condition information, which can be used to provide targeted recommendations and information to the vehicle owner over an app 100, even without owning a dongle or other data acquisition and transfer device (DAT) 102 for connecting the vehicle owner's mobile communication device 101 to a diagnostics port of the vehicle 30. However, it is also contemplated that many vehicle owners do own or are willing to buy a DAT 102. By owning a DAT 102, the vehicle owner can avoid visiting a diagnostic service provider 300 to do a scan as described above, since the vehicle owner may instead do his or her own scan using the DAT 102. As explained above, however, the same vehicle owner may at various times prefer to have the scan done by another or simply may not wish to use the DAT 102 (e.g. because of concern that it may drain the vehicle battery). In order to offer an enhanced experience to users who have a DAT 102, while still providing individualized services to all vehicle owners, it is contemplated that the app 100 may have two operation modes depending on whether or not a DAT 102 will be used: a first mode that does not use the DAT 102 (and instead directs the user to a diagnostic service provider 300) and a second mode that uses the DAT 102.

In order to provide a seamless user experience, the app 100 may automatically determine whether a DAT 102 is present (see "dongle detector/switch" in FIG. 1). For example, when operative the app 100 may autonomously detect a connection between the mobile communication device 101 and the DAT 102 (e.g. a short-range wireless connection such as a Bluetooth connection). The operation mode of the app 100 may autonomously transition to the first mode in response to a determination that the DAT 102 is not present and to the second mode in response to a determination that the DAT 102 is present. Alternatively, the app may be set to the first mode, whereupon the app 100 may proceed as discussed above, including steps 430 and 440 of FIG. 4 in which the app 100 assists the vehicle owner with getting a scan from a diagnostic service provider 300 (possibly with symptomatic diagnosis in the meantime). On the other hand, when the operation mode is set to the second mode, the app 100 may omit steps 430 and 440 of FIG. 4 entirely. In this case, the app 100 may instead retrieve diagnostic data including the VIN directly from the vehicle 30 via the DAT 102 in response to the scan instruction received in step 420. The app 100 may then upload the retrieved diagnostic data from the mobile communication device 101 to the server 200, with steps 450 and onward proceeding as described above. It is also contemplated that the app 100 may generate a barcode (e.g., QR code) encoding some or all of the retrieved diagnostic data, as described in the above-mentioned '205 and '115 applications, while the operation mode is set to the second mode. In this way, the app 100 may enable the flexible transfer of the data to another device, such as a device belonging to a third-party provider of diagnostics, auto parts, and/or repair service providers, who may then communicate with the server 200 on behalf of the vehicle owner, populate a shopping cart including vehicle-specific repair parts, etc.

When the operation mode of the app 100 is set to the second mode (i.e. DAT present), it is further contemplated that the scan instruction received in step 420 may be automatically generated rather than being based on user input (e.g. tapping the scan button 110). While the DAT 102 is present and plugged into the vehicle 30, the DAT 102 may passively collect data from the vehicle 30, such as DTCs, which may be transmitted from the DAT 102 to the mobile communication device 101. The app 100 may automatically generate the first instruction based on such passively collected data. For example, the passively collected data might have an associated urgency, which can be interpreted by the app 100. In the case of an urgent DTC or other passively collected data that is considered urgent, the app 100 may automatically generate the instruction to perform the scan, which may then automatically be performed via the DAT 102 (possibly with confirmation by the vehicle owner first: "Urgent condition detected; full scan recommended: Proceed?"). Alternatively, the first instruction may be automatically generated on a periodic basis as long as the DAT 102 is present and the operation mode of the app 100 is accordingly set to mode 2. For example, the app 100 may be set to perform a full scan using the DAT 102 once per week or according to a recommended service schedule associated with the particular vehicle 30. If, at any time, the vehicle owner wishes to forgo using the DAT 102, the app 100 may automatically switch to mode 1 and recommend nearby diagnostic service providers 300 for scanning the vehicle 30.

As explained above, the user profile 20 may, over time, become a long and detailed record of the diagnostic and service events over the lifetime of the vehicle 30. It is contemplated that this accumulated information may in some cases be passed from one user profile 20 to another as the ownership of the vehicle 30 changes, with the information remaining associated with the VIN as the VIN moves to a different user profile 20. In this way, a new owner of a vehicle 30 may still be able to access past information, which may in some cases be scrubbed to remove personal or other sensitive information of prior vehicle owners.

The functionality described above in relation to the components of the system 10 and app 100 shown in FIGS. 1-3 and the operational flow described in relation to FIGS. 4-6 and throughout the disclosure may be wholly or partly embodied in one or more computers including a processor (e.g. a CPU), a system memory (e.g. RAM), and a hard drive or other secondary storage device. The processor may execute one or more computer programs, which may be tangibly embodied along with an operating system in a computer-readable medium, e.g., the secondary storage device. The operating system and computer programs may be loaded from the secondary storage device into the system memory to be executed by the processor. The computer may further include a network interface for network communication between the computer and external devices (e.g. over the Internet), such as between the mobile communication device 101 and the server 200 or between the server 200 and computers controlled by diagnostic service providers 300, third-party providers 500, etc. To the extent that functionality may be performed at the server 200 rather than by the app 100, the server 200 may comprise multiple physical servers and other computers that communicate with each other to perform the described functionality.

The above computer programs may comprise program instructions which, when executed by the processor, cause the processor to perform operations in accordance with the various embodiments of the present disclosure. The computer programs may be provided to the secondary storage by or otherwise reside on an external computer-readable medium such as a DVD-ROM, an optical recording medium such as a CD or Blu-ray Disk, a magneto-optic recording medium such as an MO, a semiconductor memory such as an IC card, a tape medium, a mechanically encoded medium such as a punch card, etc. Other examples of computer-readable media that may store programs in relation to the disclosed embodiments include a RAM or hard disk in a server system connected to a communication network such as a dedicated network or the Internet, with the program being provided to the computer via the network. Such program storage media may, in some embodiments, be non-transitory, thus excluding transitory signals per se, such as radio waves or other electromagnetic waves. Examples of program instructions stored on a computer-readable medium may include, in addition to code executable by a processor, state information for execution by programmable circuitry such as a field-programmable gate arrays (FPGA) or programmable logic array (PLA).

In the above-described system 10 and associated methods, the use of a dongle or other data access and transfer (DAT) device 102 (see FIG. 1) may additionally allow for improved accuracy of mileage tracking functionality. Such functionality may be included in the disclosed app 100 or another mobile application installed on the user's mobile communication device 101, for example. In general, in order to determine an estimated mileage for various purposes such as expense reimbursement or tax calculation, the app 100 or another mobile app (e.g., a third-party app) may use GPS to estimate a distance traveled by the mobile communication device 101. Since the user is not always traveling in his/her vehicle 30, such functionality may, for example, first check for a known Bluetooth signal indicating that the mobile communication device 101 is within the vehicle 30. If it is determined that the mobile communication device 101 is within the vehicle 30 (i.e., within Bluetooth range), the GPS-derived distance may be logged as vehicle mileage. The disclosed system 10 and methods may improve the accuracy of such functionality by periodically correcting the GPS-based or otherwise estimated mileage. To this end, while the DAT 102 is present and plugged into the vehicle 30, the DAT may receive accurate mileage data collected from the ECU 32 of the vehicle 30, which may then be transmitted from the DAT 102 to the mobile communication device 101. The app 100 can then update the estimated mileage by, for example, replacing it with the mileage data collected from the vehicle 30. At other times, while the DAT 102 is not being used, the app 100 may presume the correctness of the GPS-based or otherwise estimated mileage until the next periodic correction. In this way, the accuracy of the mileage tracker functionality can be improved, whether such functionality resides in the app 100 itself or in a separate app that the app 100 communicates with on the mobile communication device 101.

It is noted that the dongle or other data access and transfer (DAT) device 102 that is referred to throughout the above disclosure may be a DAT 102 that is specifically adapted to interface with the app 100 or may be a DAT 102 developed by a third party unrelated to the provider of the app 100. With regard to the latter case, it is contemplated that the app 100 may have compatibility with multiple DATs 102, including backwards compatibility with legacy DATs 102. To this end, the DAT 102 may be configured to (or configurable to) communicate over the OBD port of the vehicle 30 using a plurality of protocols, for example, the ELM327 command protocol.

As described above, it is contemplated that each list item 150 displayed on the app 100 in response to the user's request (see FIG. 3), whether it be for repair services, auto parts, or roadside assistance, may include a display of the associated cost. The displayed cost may be an estimated cost as noted above, which may be derived from past cost data specific to the defect and the particular vehicle 30. Since, as explained above, the cost may vary from third-party provider to third-party provider, it is contemplated that the estimated cost may further be derived for each specific third-party provider based on past data. Alternatively, or additionally, the app 100 may display an actual bid as the cost for each list item 150. For example, in response to the user's request over the app 100, the system 10 may send an information package including information about the particular diagnostic condition and vehicle 30 to each of a plurality of third-party providers (step 491 of FIG. 6), who may then respond with individual bids for the repair, auto parts, or roadside assistance (step 492 of FIG. 6). The information package may include the same vehicle condition information that is derived from the diagnostic data and used to generate the vehicle condition report 140 for the user. In some cases, the system 10 may scrub personal or other identifying or sensitive information from the version that is sent to third-party providers to obtain a bid, with a more complete version of the vehicle condition information thereafter being provided to the third-party provider that is selected by the user (if necessary or desired).

As explained above, the diagnostic service provider 300 may in some cases be an individual owner of a scan tool who comes to the vehicle owner and performs the scan wherever the vehicle owner is located. As such, the button 122 associated with that particular diagnostic service provider 300 (see FIG. 2) may instead initiate a call (e.g. via the smartphone's native calling functionality) or book an appointment (e.g. via a third-party app or weblink) with the diagnostic service provider 300, rather than giving directions. Along the same lines, it is also contemplated that the third-party provider 500 (e.g., the repair service provider or auto parts provider) may similarly perform repair services or provide parts wherever the vehicle owner is located. Such a third-party provider 500 may be a skilled individual or an auto parts reseller, for example, who may provide peer-to-peer services as part of the so-called "share" economy. Thus, the button 152 associated with such a mobile-type third-party provider 500 (see FIG. 3) may similarly initiate a call or book an appointment with the third-party provider 500, rather than giving directions.

In the above example of the app 100 in which symptomatic vehicle diagnostic functionality is offered in addition to scan-based diagnostics, it is described that the app 100 may prompt the user to input information on the mobile communication device 101, for example, in the form of answers to a series of questions. However, the disclosure is not limited to such question-based symptomatic diagnosis. As another example, the app 100 may derive symptom data from an analysis of the noise or vibration of the engine, which may be sensed by the mobile communication device 101 using a microphone 103 and/or accelerometer 104 thereof, for example. The app 100 may further access vehicle identifying information (e.g., the VIN) of the vehicle 30, either by taking it from the user profile 20 (e.g., accessed at the server 200 or on the mobile communication device 101) or receiving it as user input to the app 100. Based on the symptom data derived by the app 100 and the vehicle identifying information (as well as in some cases past vehicle condition information associated with the user profile 20), the app 100 may derive the symptomatic diagnostic condition information, which may be displayed on the mobile communication device 101 to inform the vehicle owner as described above.

It is also contemplated that the symptom data, whether derived from sound/vibration analysis or from user input, may be used to build a machine learning database for the specific vehicle 30 and/or more broadly for the year/make/model/engine. As an example, the user may request the symptomatic diagnosis while waiting for a scan-based diagnosis as described above. In this case, the diagnostic condition information derived from the scan may represent a "correct" diagnosis of the vehicle, which can then be associated with the near-in-time symptom data that was captured by the mobile communication device 101. The association between the collected symptom data with the "correct" scan-based diagnosis may serve as training data to a machine learning model. In this way, a machine learning model may be developed that is specific to the exact vehicle 30 driven by the user (e.g., the vehicle is exhibiting the exact same noise and therefore likely has the same problem as last time). By the same token, a large quantity of data from many users may be collected to build machine learning models having broad applicability to the year/make/model/engine of the vehicle 30, thus improving the sound or vibration-based symptomatic diagnostics capability of the app 100 for all users.

Figure 7:
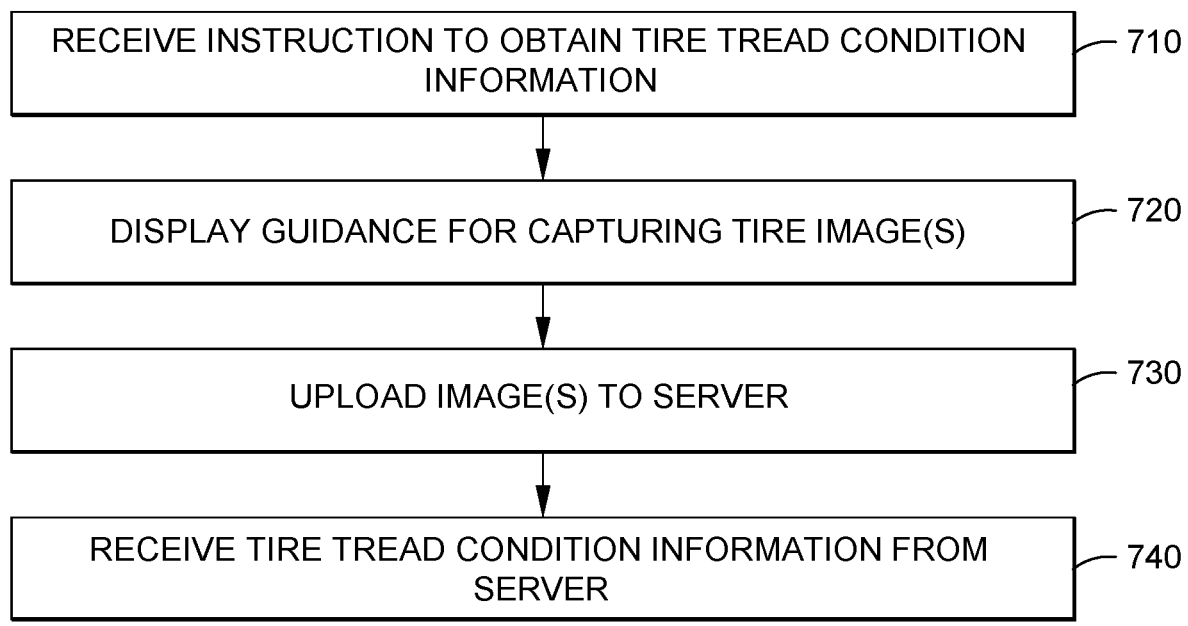
FIG. 7 shows another example operational flow according to an embodiment of the present disclosure.

Another source of information about the user's vehicle 30 that is contemplated by the present disclosure is captured image data of the vehicle's tires. Such image data may be analyzed to diagnose the condition of the vehicle's tires and, in particular, the wear of the tire treads. In this regard, FIG. 7 shows an example operational flow for tire tread diagnostics. In response to an instruction to obtain tire tread condition information received at the mobile communication device 101 (step 710), the app 100 may display guidance on the mobile communication device 101 for capturing one or more images of a tire of the vehicle 30 using a camera 105 of the mobile communication device 101 (step 720). The guidance may include, for example, written or spoken instructions describing where exactly to point the camera 105 for the most accurate analysis. The user may be directed to move vehicle point to vehicle point capturing the tire side wall or the tread, e.g., from the front-left of the tire to the front-right, etc. In this way, diagnostics can be assessed from various points of the vehicle 10. The guidance may include displaying one or more image capture templates on the screen of the mobile communication device 101 superimposed on the camera view. The image capture template(s) may, for example, show an outline of a typical tire and a portion of a vehicle for context, and the user may line up the outline with the actual tire of the vehicle to achieve the correct orientation and optimal distance for capturing the image(s). The guidance may include feedback to the app 100 based on detected objects within the camera view, such as an instruction to "back up" or "move closer." In some cases, the feedback may be in the form of a command issued to the mobile communication device 101 by the app 100 to automatically capture the image when the camera 105 is correctly lined up with the tire.

Once the image(s) are captured by the mobile communication device 101, they may be uploaded to the server 200 for tire tread analysis (step 730). A scan of the tires can uncover interesting information about the state of a vehicle's tires, steering and suspension. These digital images can calculate the tread wear depths and patterns, then the calculations can be processed with diagnostics and for the assessment of vehicle alignment, steering, suspension, tire condition and rotation recommendation. Using digital imaging and VIN and/or tire identification number (TIN, which may be used for safety recall tracking), for example, an analysis of tire tread depth/wear may be undertaken, which may include assessing over/under inflation, camber, caster, toe, and/or suspension/shock issues, for example. The tire tread analysis may be conducted, for example, by comparing one or more image features to one or more thresholds established from known data and/or by inputting one or more image features to a machine learning model. In some cases, the tire tread analysis may be a part of the symptomatic diagnosis described above, with the image(s) or features thereof being used as a symptom together with other symptoms (sound/vibration and/or user input). The output of the tire tread analysis (and/or symptomatic diagnosis) may then be received by the app 100 and displayed to the user, for example, in the form of tire tread condition information report (step 740). Such a report may, for example, indicate that tires are in need of repair or that new tires are needed or provide a recommended timelines for replacing tires. Repair recommendations resulting from depth and wear analysis may include recommendations to replace tire(s), rotate tires, perform vehicle alignment, replace shocks, and/or replace steering and suspension components, for example. In some cases, it may be recommended to replace a tire when it is not possible or not practical to repair tire damage caused by a road hazard, such as when the tire is over six years old or when road debris lodged in the tire is too big (e.g., more than one-quarter inch) or is too close to the tire's edge (e.g., less than one-half inch). In a case where the output of the tire tread analysis is used as part of a symptomatic diagnosis of the vehicle 30, the symptomatic diagnostic condition information received by the app 100 from the server 200 and displayed as described above (and/or used to build a machine learning model) may include one or more items that are at least in part derived from the tire tread analysis.

Upon viewing tire tread condition information presented by the app 100 on the mobile communication device 101 (e.g., in a report as described above), the user may be presented with an option to repair a defect indicated by the tire tread condition information. This may proceed in the same way as described above in relation to requesting repair services, auto parts, or roadside assistance. For example, in response to the vehicle owner's interaction with the "get service" button 142 (see FIG. 3) or a corresponding button of a tire condition report in a case where the report is tire-specific, the app 100 may transition to the third (center-right) and fourth (right-most) views of FIG. 3, where the app 100 may display a list of third-party providers 500 having the capability to repair the defect and/or replace the tires. When the vehicle owner has made his or her decision, he or she may tap the button 152 ("GO") to be directed to the selected third-party provider 500 in the same way as described above, for example, with the app 100 receiving a geolocation of the specified provider 500 and displaying it on the mobile communication device 101.

The tire tread analysis my additionally include a comparison of the one or more images and/or image feature(s) to modelled tire degradation based on the tire manufacturer's recommended mileage life. The modelled tire degradation may comprise, for example, a linear degradation over the tire lifecycle, and the inbound images captured by the mobile communication device 101 may be compared to this assumed/modeled degradation in order to make recommendations to the user based on the expected life of the tire. Such analysis can inform the user as to how his/her tires are doing vs. how they should be doing at a given point in the tire lifecycle. The results could further be stored by the server 200 in the user profile 20 associated with the specific driver and vehicle 30. The results may depend, for example, on how the particular driver handles the vehicle (e.g., whether he/she drives aggressively, accelerates rapidly, etc.) and on what surfaces the particular vehicle 30 is typically driven, for example. Over time, trends in tire degradation of a specific driver and/or vehicle 30 relative to modeled degradation may be used to accurately predict when tires will need to be replaced or repaired. The server 200 and/or app 100 could then predict tire change periods ahead of time, rather than just judging current tire degradation, even without the use of any current image data (and the predictions may be refined as image data is collected). Appropriate offers for upcoming tire replacement/repair (e.g., based on location of nearby service centers, etc.) could then be presented to the user via the app 100.

Yet another source of information about the user's vehicle 30 that is contemplated by the present disclosure is tire pressure sensor data. In this regard, the app 100 may be operable to derive tire pressure data associated with the vehicle 30 from an analysis of one or more tire pressure signals received by the mobile device 101 (e.g., over a short-range wireless connection such as a Bluetooth connection). In some cases, the app 100 may interface directly with a plurality of individual tire pressure sensors 34 in the tires, receiving a respective signal from each sensor 34. Instead, or in addition to this, the app 100 may be capable of interfacing with a signal receiver 36 that may be installed in the vehicle 30. The signal receiver 36 may receive the individual tire pressure signals from each tire, which may be in a variety of formats depending on the particular sensors 34 deployed and settings thereof. The signal receiver 36 may function to translate or otherwise convert the tire pressure signals to a format that is suitable for analysis by the app 100, which may then receive the converted tire pressure signal(s) from the receiver 36. Based on the tire pressure signal(s), the app 100 may present tire pressure information to the user on the mobile communication device 101, such as in the form of a diagram of the vehicle 30 showing respective pressure amounts next to each of the four tires. The app 100 may also issue alerts to the user when tire pressure is outside of a manufacturer-recommended range. Example tire pressure sensor functionality, including the use of a receiver in relation to a universal tire pressure monitor, can be found in U.S. Pat. No. 7,518,495, filed Nov. 18, 2003 and entitled UNIVERSAL TIRE PRESSURE MONITOR, the entire contents of which is expressly incorporated herein by reference. In some cases, the app 100 may upload tire pressure sensor data to the server 200 for additional analysis, possibly in conjunction with and as part of the tire tread analysis discussed above.

In some cases, the diagnostic data stored in the user profile 20, which may be used by the app 100 to provide functionality and recommendations that are tailored to the user's specific vehicle 30 as described herein, may be collected as part of diagnostic data collection processes that are initiated outside the app 100. To illustrate one such example use case, as described in the above-mentioned '205 and '115 applications, an auto parts store might provide customers with access to kiosks 600 (e.g., in-store kiosks that may be standing kiosks or on-the-counter kiosks) that allow the customers to inspect/scan their vehicles 30 to obtain a vehicle health report (VHR). Diagnostic data may be acquired from a customer's vehicle 30 using a scan tool or dongle available for use at the store, either one that is attached to the kiosk 600 by a cable or one that is a separate device (e.g., provided to the customer by a store clerk) subsequently connected to the kiosk 600 to upload the vehicle data to a backend server (e.g., the server 200) that returns the VHR. The kiosk 600 may then display the VHR on a display screen of the kiosk 600 or tablet communicable with the kiosk 600 for viewing by the user, while at the same time the VHR (and/or diagnostic data) may be stored by the server 200 in the user profile 20 in association with the particular user and the user's specific vehicle 30 (e.g., using the VIN included in the diagnostic data to link the data to the appropriate user profile 20). Such a kiosk 600 may also provide the user with a copy of the report by generating a barcode as described above, without requiring the user to enter in an email or phone number as a destination of the report and without requiring the user's device to necessarily have access to the diagnostic functionality of the server 200 (such as via a URL). The kiosk 600 or tablet may simply display the QR code or other barcode encoding the diagnostic data and/or VHR itself to quickly enable the transfer of the report from the kiosk/tablet screen directly to the user's phone 101 using the camera 105. In addition, when a report is complete, the store staff could scan the displayed barcode to ingest or populate the shopping cart with the items needed directly to their point-of-sale (POS) terminals, without the need to upload the vehicle diagnostic data via the store computer server. This transfer would help staff sell and/or provide advice in relation to the necessary parts needed for service of the vehicle 10. At the same time, the user profile 20 may in this way accumulate historical diagnostic data about the user's vehicle 30, even when the app 100 is not used to perform the scan. The services of various business entities, such as auto parts stores offering such kiosks 600, may thus be enhanced through seamless integration into the app-based system described herein.

It is contemplated that the geolocation of the mobile communication device 101, which may be derived using cellular data and/or a GPS module 106 as described above, may additionally be used by the app 100 to direct location-specific coupons, sales, and other offers to the user. For example, the server 200 may connect to a database of offers, which may be pushed to the app 100 as the mobile communication device 101 moves near to a business having a relevant, current offer (or when the app 100 determines that such a business is on an expected route of the vehicle 30). The relevance of the offers to a particular user may be determined according to the information in the user profile, which may include various information input by the user, for example, personal interests, consumer habits, preferred stores, etc., in addition to the information about the user's vehicle 30 and its history. In this way, the app 100 may tailor the experience for each individual user while minimizing the presentation of unwanted offers that might otherwise be perceived as spam.

In general, the app 100 may have various features to improve the user experience and encourage use of the app 100. For example, the app 100 may include gamification features such as achievements, progress bars, badges, points, rewards, etc. A user may earn an achievement by requesting roadside assistance using the app 100, for example. The achievement or other gamification feature may then be displayed on the user profile. It is contemplated that there may be a social component to the app 100, where users may view each other's gamification features and possibly connect socially, such as by messaging or linking to third-party social media profiles. To this end, the user profile may comprise a private version, which is accessible only by the particular user and includes diagnostic information about the user's vehicle 30, and a public version, which is accessible to other users and does not include private information. The public version of the user profile may include the gamification features, for example, as well as general information about the user and/or the user's vehicle 30 to the extent permitted by the user. In this way, the app 100 may serve as a gateway to a vehicle-centric social network.

Figure 8:
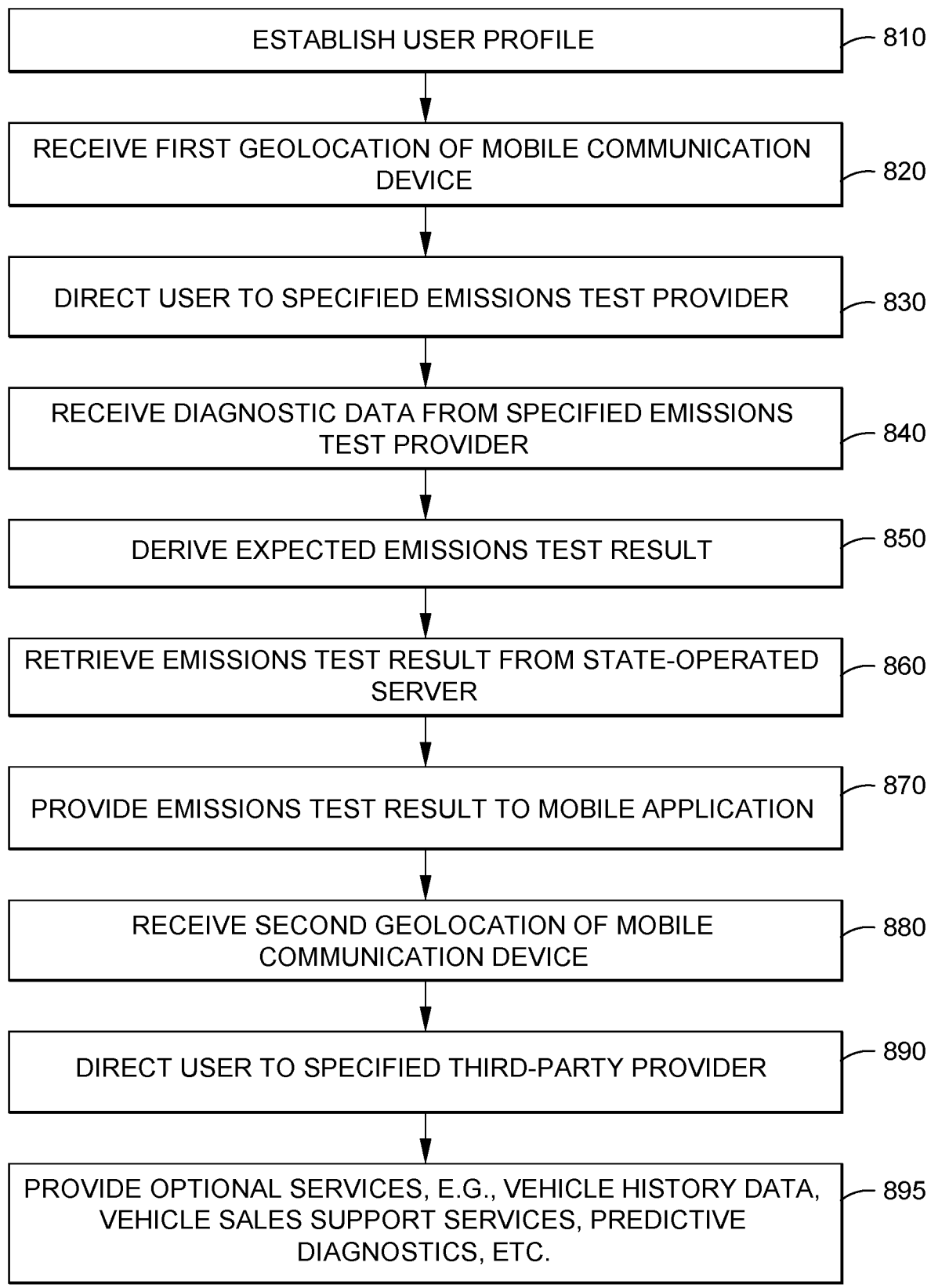
FIG. 8 shows another example operational flow according to an embodiment of the present disclosure.

Of interest to individuals, businesses, and government authorities alike, the system 10 and app 100 described herein may integrate with emissions testing processes with the overarching goal of reducing harmful vehicle emissions and benefiting the environment. In this regard, the disclosed system 10 may function as part of or as an overlay on existing emissions testing technology currently implemented by various state authorities. Additionally, it is envisioned that the benefits of the disclosed system 10 will be recognized by the relevant state authorities and may help to shape future emissions testing regulations and government-operated systems as aspects of the technology described herein are adopted to the benefit of all parties. By way of example, FIG. 8 shows an operational flow of the system 10 as pertains to contemplated processes for supporting mobile application-based assistance with vehicle emissions testing compliance. The operational flow of FIG. 8 may be performed, in whole or in part, by a host emissions test server 201 (see FIG. 1), which may be operated by the same business entity that provides the app 100. The host emissions test server 201 may communicate with the server 200 described above that communicates with the vehicle owner's mobile communication device 101 executing the app 100. In some cases, the server 200 may perform some of the steps of FIG. 8, while the host emissions test server 201 performs others. In other iterations, there may be no dedicated host emissions test server 201 and the entire operational flow of FIG. 8 may be performed by the server 200.

A user profile 20 associated with a user of the mobile communication device 101 (namely, the vehicle owner), may be established by the app 100 and/or the server 200 as described above in relation to step 410 of FIG. 4 (step 810 in FIG. 8). For example, the server 200 may establish the user profile 20, which may include the VIN associated with a registered vehicle. Information is collected from the user when the user initially sets up the app 100 on his/her mobile communication device 101. Over time, the server 200 may update the user profile 20 to reflect additional information, e.g., prior smog tests, OEM maintenance schedule information, diagnostic information from prior scans, historical data relating to the operation of similar vehicles, prior service and other recorded vehicle events and conditions, including emissions system related events and conditions (e.g., to include data from emissions tests, emissions test results, emissions test scheduling information, etc.), as described in more detail below.

The data package from the vehicle includes the VIN along with data and condition information received from hundreds or thousands of sensors, controllers, memories, etc. a portion of which is related to the operation and condition of emissions test systems. The vehicle data package may be received by the server 200 from the host emissions test server 201, for example. The operational flow may continue with receiving, from the mobile communication device 101, a first geolocation of the mobile communication device 101 (step 820), which may be used by the server 200 to locate nearby emissions test providers for the user. The first geolocation may be determined by the app 100 using cellular data and/or a GPS module 106 included in the mobile communication device 101. As described above, this can be done on a schedule (e.g., periodically) or may be done on demand in response to a "get smog check" instruction input to the app 100 by the user. As described in more detail below, the user may also enter a "get a smog test report" or "get a smog certification" instruction to initiate activity and communication links to implement the instruction. Advantageously, in a case where the user profile 20 includes an emissions test schedule associated with the vehicle 30, the server 200 may alternately provide a notification to the app 100 based on the emissions test schedule, letting the user know that the vehicle 30 is due for an emissions test for example. The user may then interact with the app to initiate the process of finding an emissions test provider, causing the app 100 to contemporaneously determine the geolocation of the mobile communication device 101 to be used by the server 200 as the first geolocation.

The operational flow of FIG. 8 may continue with directing the user of the app 100 to a specified emissions test provider (step 830). From the perspective of the server 200, directing the user to the specified emissions test provider may, in one embodiment, comprise providing one or more geolocations of emissions test providers to the app 100. In more detail, from the perspective of the app 100, the process of directing the user to the specified emissions test provider may mirror the process of directing the user to the specified diagnostic service provider of step 440 of FIG. 4, including the sub-operational flow of FIG. 5, with the major difference being that the diagnostic service provider 300 (see FIG. 1) is in this case an emissions test provider (ETP) that provides a diagnostic tool (e.g., scan tool, dongle, kiosk 600, etc.) to obtain the diagnostic data from the registered vehicle for purposes of an emissions test and uploads the data to be evaluated in accordance with the specific implementation being used.

In general, the diagnostic tool may typically be a so-called "shared" or "S-type" diagnostic tool that is intended to be connected to vehicles belonging to many different customers of the specified emissions test provider. Depending on the requirements of the relevant regulatory authority, the diagnostic tool may be any device capable of connecting to the vehicle's OBD port and obtaining the relevant diagnostic data or may be of a specific type, such as a Data Acquisition Device (DAD) as specified by the Bureau of Automotive Repair for the BAR OBD Inspection System in the state of California. For purposes of the emissions test, the diagnostic tool may be operable to provide the obtained diagnostic data (either directly or via the host emissions test server 201) to a state emissions test server 700 that is capable of deriving an emissions test result for the registered vehicle 30.

The state emissions test server 700 may be, for example, a state-operated server such as a web server or application server associated with BAR's Next Generation Electronic Transmission (NGET) Web Application (NWA) in the state of California or, as another example, the Demilitarized Zone (DMZ) server of the Department of Environmental Quality (DEQ) in the state of Oregon. It is contemplated that the system 10 may be capable of interfacing with a variety of different state emissions test servers 700 as shown, with the necessary protocols for communicating with each state emissions test server 700 being stored by the host emissions test server 200 or 201 in its capacity as an adapter, for example. In this respect, the host emissions test server 201 may host all the DEQ and other regulatory authority adapters and logics to handle different business logics from different states and jurisdictions. In this way, the host emissions test server 201 can support the scaling of the system 10 to provide for emissions testing within the bounds of various legal and technological frameworks as they evolve. In the context of the more broadly defined system 10 described herein, the host emissions test server 201 may be thought of as an add-on or plugin to provide enhanced emission testing functionality, where the separation of the host emissions test server 201 from the server 200 may allow for a separation of related concerns, enabling increased security (e.g., of sensitive emissions test data) as well as adaptability to allow a seamless deployment as support for each new state or jurisdiction is added, for example. As a result, potential emissions test providers, such as large auto parts stores operating in multiple states, may benefit from the system 10 as they can avoid the burden of establishing procedures to conform with each individual state's emissions test regulations and technical requirements.

As shown in FIG. 1, the various diagnostic service providers 300 and kiosk 600 that may serve as the specified emissions test provider may communicate with the host emissions test server 201, which may in turn provide the relevant emissions test server 700 with the diagnostic data of the vehicle 30. In this case, the server 200 may act as a host or, using the terminology used in the state of Oregon, as the data acquisition server of DEQ's Remote OBD system. Alternatively, in a case where the emissions test provider acts as the host, the various diagnostic service providers 300 and kiosk 600 serving as the specified emissions test provider may instead provide the emissions test server 700 with the diagnostic data of the vehicle 30 directly. In general, the diagnostic data may be transmitted from the diagnostic tool to the emissions test server 700 directly or via any number of software applications executing on computers and/or servers operated by the provider of the app 100 (e.g., the server 201), the specified emissions test provider, or the relevant state authority. It is noted that some regulatory jurisdictions may mandate specific routes for transmitting this data to the emissions test server 700 in order to ensure that the diagnostic data is not modified en route.

As noted above, the same business entity that provides the app 100 and operates the server 200 (and typically the same business entity that provides the diagnostic tool to the emissions test provider, who may then provide the diagnostic tool to a retail customer for use) may further operate the host emissions test server 201. The host emissions test server 201 may be dedicated to collecting the diagnostic data from the diagnostic tool and forwarding it to the emissions test server 700 operated by the relevant state authority and may to varying degrees be isolated from the other elements of the system 10 in order to comply with jurisdictional requirements concerning security and privacy of vehicle data. As illustrated, the host emissions test server 201 may communicate with the server 200, which may in turn communicate with the diagnostic database 400 for the purpose of analyzing the diagnostic data collected by the emissions test provider as described in more detail below, as well as with a database storing the user profile 20 in order to match the diagnostic data with a particular app user. For example, in the case of an app user, the privacy of the diagnostic data may be governed by an agreement between the provider of the app and the app user, allowing the diagnostic data to be associated with the individual vehicle owner. In the case of a non-app user, a query of user profiles 20 may reveal no match to the VIN in the diagnostic data, in which case the host emissions test server 201 may proceed in a limited capacity with respect to the non-app user's data, such as by communicating the data to the state emissions test server 700 but not to any third-party product or service provider 500, for example.

Equivalently to the sub-operational flow of FIG. 5, the app 100 may receive geolocations of a plurality of emissions test providers in relation to the first geolocation of the mobile communication device 101 (see step 442) and display a list of nearby emissions test providers as described in relation to FIG. 2 in the case of diagnostic service providers 300 generally (e.g., those emissions test providers having a geolocation within a threshold distance or travel time). In this regard, FIG. 2A, which is a modified version of FIG. 2, shows a sequence of screenshots of the mobile application in relation to getting an emissions test scan. The app 100 may then receive a selection of one of the emissions test providers via user input to the mobile communication device 101 (see step 444), such as by the user expanding one of the list items 120 shown in FIG. 2A. The app 100 may then display the geolocation of the selected emissions test provider as shown in the right-most view of FIG. 2A ("ADDRESS") (see step 446), thus directing the user to the selected emissions test provider. The user may further request navigation assistance using the button 122 if desired. Whereas the scan button 110 is illustrated in FIG. 2, it is contemplated that the process of finding a nearby emissions test provider may similarly be initiated by user input to the app 100, for example, using a "get smog check" button (indicated by reference number 110a in FIG. 2A) or interacting with a smog check schedule notification as described above. It is noted that step 442 may, from the perspective of the server 200, correspond to providing the geolocations of the plurality of emissions test providers (or more generally the plurality of diagnostic service providers and/or kiosks 600) to the app 100.

After arriving at the site of the selected emissions test provider (though it is contemplated that in some cases the emissions test provider may instead come to the vehicle owner or that the vehicle may already have a C-type device connected to the OBD port), the vehicle 30 may undergo the emissions test. The emissions test (e.g., smog check) may include various components including a visual inspection of the vehicle, analysis of actual tailpipe exhaust, and, of particular relevance to the disclosed system 10, scanning of the vehicle 30 using a diagnostic tool operated by the selected emissions test provider. As noted above, the diagnostic data obtained from the vehicle's OBD port by the diagnostic tool may be uploaded by the host emissions test server 201 or by the emissions test provider (directly or indirectly) to the applicable state emissions test server 700 consistent with any relevant regulations. Advantageously, in accordance with the disclosed system 10, the same diagnostic data or a portion thereof may in either case also be received by the host emissions test server 201 (step 840), which may be operated by an entity that is independent from both the government authority and the emissions test provider and may be the same entity that provides the app 100. That is, in a case where the host emissions test server 201 forwards the data to the state emissions test server 700, the host emissions test server 201 may also retain the data for diagnostic purposes. Or, in other cases, the emissions test provider may provide the obtained diagnostic data in parallel both to the state-operated emissions test server 700 and to the host emissions test server 201. By receiving the diagnostic data associated with the emissions test, the host emissions test server 201 is able to provide enhanced services both to the user of the app 100 (i.e., the vehicle owner) via the app server 200 and, in some cases, to the government authority in the form of fraud detection. In this way, the system 10 may benefit vehicle owners and government authorities alike, while at the same time driving business to emissions test providers via the app 100.

In one aspect, the system 10 may be thought of as managing the user's emissions test compliance. In this capacity, the role of the servers 200, 201 and app 100 may be limited, for example, to notifying the user of the need to get their vehicle 30 tested and directing the user to the emissions test provider as described above (steps 810 through 830) and, later on, storing the actual results of the emissions test in the user profile 20 to be readily viewable by the user within the app 100. As such, the operational flow of FIG. 8 may proceed with retrieving the emissions test result (e.g., pass/fail and also detailed report) from the emissions test server 700 to be stored in the user profile 20 (step 860) and providing the emissions test result to the app 100 (step 870). In a case where the host emissions test server 201 acts as the host server and is responsible for providing the diagnostic data to the state emissions test server 700, step 860 of retrieving the emissions test result from the state emissions test server 700 may comprise uploading the data to the state emissions test server 700 so that the state emissions test server 700 can evaluate the data and determine the official test result, after which the test result can be provided to the app 100 in step 870 (via the server 200). In some cases, the emissions test result may be provided to the app 100 in the form of a link by which the user may retrieve the emissions test result (e.g., from a remote location such as via a website). Depending on the emissions test result, and in particular in the case of a failed emissions test, the server 200 may then receive a new geolocation of the mobile communication device 101 (step 880) and direct the user to a specified third-party provider 500 (see FIG. 1) such as an auto repair service provider having a capability to repair a defect indicated by the emissions test result or an auto parts provider having a part suitable to repair a defect indicated by the emissions test result (step 890). From the perspective of the server 200, directing the user to the specified third-party provider 500 may comprise providing one or more geolocations of emissions test providers to the app 100.

Figure 3A:
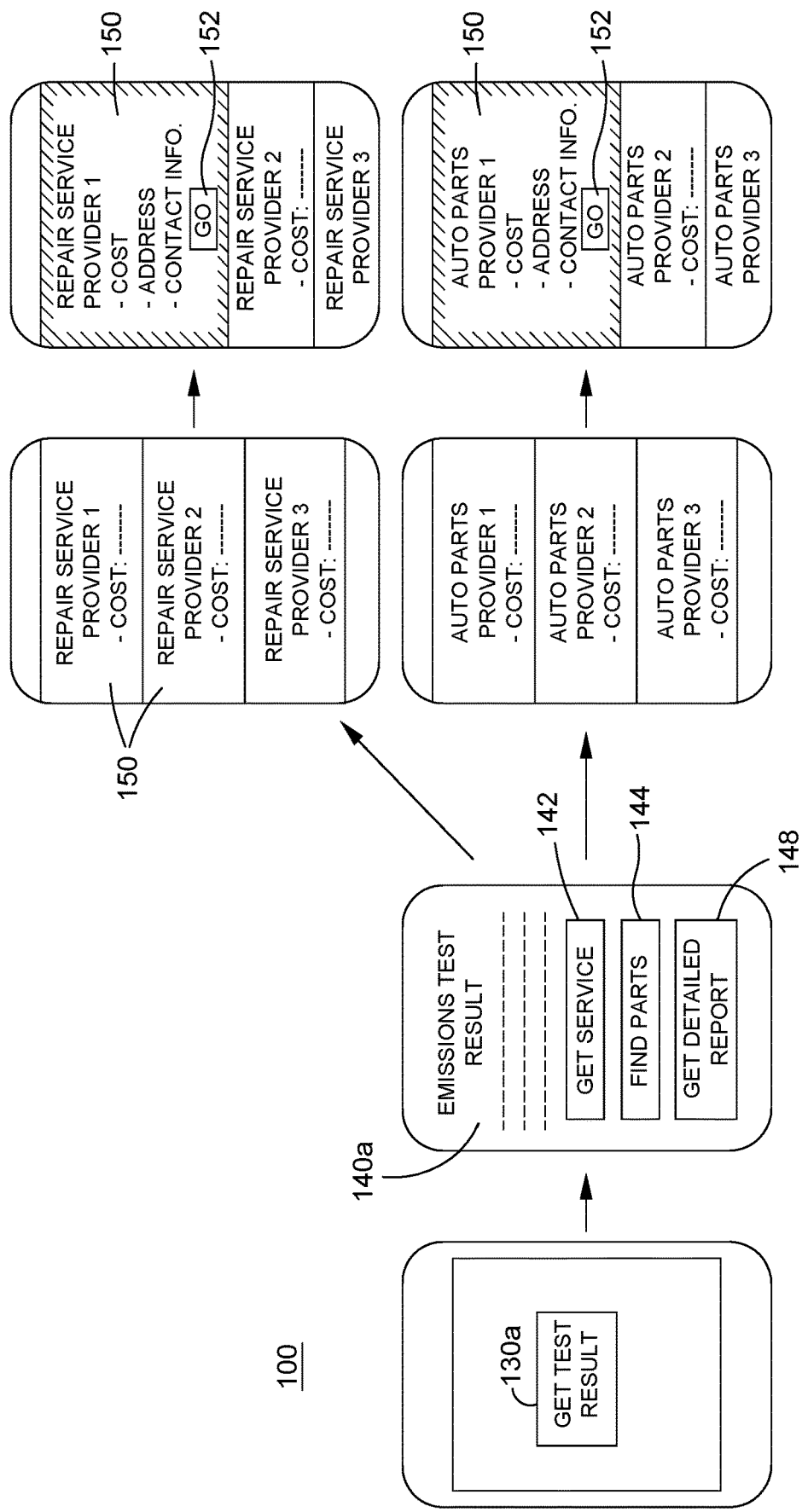
FIG. 3A shows a sequence of screenshots of the mobile application in relation to viewing an emissions test result and a detailed report.

In more detail, from the perspective of the app 100, the process of directing the user to the specified third-party provider may mirror the process of directing the user to the specified third-party provider of step 490 of FIG. 4 and illustrated in FIG. 3, including the sub-operational flow of FIG. 6, with the major difference being that the third-party provider(s) 500 in this case are those capable of addressing a defect in the emissions test result (and thus getting the vehicle 30 back in compliance with emissions regulations) instead of a vehicle condition report more generally as shown in FIG. 3. In practice, these may be repair service shops or auto parts stores, for example. In this regard, FIG. 3A, which is a modified version of FIG. 3, shows a sequence of screenshots of the mobile application in relation to viewing an emissions test result 140a and a detailed report. As shown, whereas a vehicle condition report 140 is more generally illustrated in FIG. 3 (e.g., outside the context of an emissions test), FIG. 3A illustrates the receipt by the user of an emissions test result 140a, which may be received on the app 100 in response to the tapping of a "get test results" button 130a, for example. In addition to "get service" and "find parts" buttons 142, 144, the app 100 may further present a "get detailed report" button 148. In response to a user pressing the button 148, the app 100 may further provide a detailed report (e.g., a vehicle health report) that may be derived from the diagnostic data that was used to determine the emissions test result 140a (and may make use of other items of the OBD data besides what is used for the emissions test, for example). As one example, the detailed report may be substantially the same as the vehicle condition report 140 described above, in which case the pressing of the button 148 may navigate the user to the view of the vehicle condition report 140 of FIG. 3, for example. It is noted that step 492 may, from the perspective of the server 200, correspond to providing the geolocations of the plurality of third-party providers 500 to the app 100.

In this relatively limited managerial aspect of the operational flow shown in FIG. 8, the diagnostic data received by the host emissions test server 201 from the emissions test provider in step 840 may be used primarily to automatically link the emissions test event with the particular user (without the user needing to input any information to the app 100). In particular, the server 201 may detect the VIN of the registered vehicle 30 in the diagnostic data received from the emissions test provider. In accordance with the relevant jurisdictional protocols, the VIN may then be used as a key to look up the emissions test result using a publicly available website or API associated with the emissions test server 700 operated by the government authority. The same VIN (which matches the VIN included in the emissions test result) may then be matched with the owner of the vehicle 30 (e.g., by the server 200) by querying stored user profiles 20 for a matching VIN. It should be noted as well, however, that the app 100 may also provide additional optional services such as vehicle health report (VHR), vehicle history data, vehicle sales support services, predictive diagnostics, etc. as described above at any point based on the vehicle diagnostic data and/or information stored in the user profile 20 (step 895). By providing such additional functionality, and in the process directing users to needed parts and services, the disclosed system 10 may be of much greater advantage to retailers and users alike in comparison to conventional emissions testing systems.

In another aspect, the operational flow of FIG. 8 may further include deriving an expected emissions test result based on the diagnostic data received from the emissions test provider (step 850). For example, the server 200 may derive the expected emissions test result by various methodologies, which may include comparing the received diagnostic data with data stored in the diagnostic database(s) 400 as described above in relation to deriving vehicle condition information more generally. Of particular advantage, however, it is contemplated that the server 200 may apply the same criteria that is applied by the state emissions test server 700 in an effort to simulate the official evaluation that will be conducted by the relevant regulatory authority. Although the expected emissions test result derived by the server 200 may not be valid for purposes of complying with regulatory requirements (and might not be usable to renew a vehicle registration, for example), the expected emissions test result may still be of great value to the vehicle owner for various reasons. For example, the expected emissions test result may be determined more quickly (e.g., immediately) for the vehicle owner's consideration, after which the vehicle owner might earlier have peace of mind (in the case of a passed emissions test) or might earlier be able to correct the defect (in the case of a failed emissions test).

As another potential advantage of the expected emissions test result, it is contemplated that the system 10 may in general be used to direct the vehicle owner to an OBD-only emissions test provider in a regulatory jurisdiction that requires the vehicle 30 to have a more robust test including, for example, a visual inspection of the vehicle and analysis of actual tailpipe exhaust, possibly with a requirement that state-certified personnel be present during the inspection. In this case, the expected emissions test result provided to the vehicle owner by the server 20 via the app 100, which is based on the OBD-component only, may not perfectly predict the actual result but may instead serve as a highly accurate OBD-based prediction of a more involved emissions test. With such a system 10, the vehicle owner may greatly benefit from initially viewing an expected emissions test result (e.g., the result of a pretest) prior to getting the full test. In particular, if the expected emissions test result indicates a fail, the vehicle owner may opt to service the vehicle 30 in accordance with the detailed report of the expected emissions test result prior to getting the actual emissions test. In this regard, it should be noted that steps 870, 880, and 890 may all proceed using the expected emissions test result derived by the server 200 instead of any actual emissions test result retrieved from the state emissions test server 700. By reviewing the expected emissions test result and servicing the vehicle 30 accordingly, the vehicle owner can avoid the wasted time and costs associated with undergoing a full emissions test that the vehicle 30 is highly likely to fail in its current state (such as if readiness indicators are incomplete). It should be noted that the diagnostic data received by the host emissions test server 201 from the emissions test provider in this case (i.e., in a case where OBD-only data is not sufficient to meet the regulatory requirements) may or may not be transmitted by the emissions test provider to the emissions test server 700 in parallel as described above.

In yet another aspect, in addition to the managerial and predictive aspects described above, the host emissions test server 201 may further assist the state agency or other regulatory authority with the detection of fraud and tampering. To this end, as part of or prior to the retrieval of the emissions test result from the state-operated emissions test server 700 (step 860), such as during uploading of the diagnostic data to the state emissions test server 700, the host emissions test server 201 may communicate with the emissions test server 700 to provide insights into the diagnostic data and serve in an advisory capacity to the government authority. The server 200 (in communication with the host emissions test server 201) may, for example, analyze the diagnostic data of the vehicle 30, possibly in comparison with prior diagnostic data and vehicle condition reports stored in the user profile 20, to determine i) whether the vehicle 30 is indeed the correct vehicle 30 associated with the VIN and/or ii) whether the vehicle 30 has been outfitted with any illegal "defeat device" or has otherwise had its hardware or software modified to circumvent emissions control regulations (e.g., to tamper with an emissions control system of the vehicle 30). The host emissions test server 201 may then provide this information to the state emissions test server 700, which may integrate it into its pass/fail logic for generating the emissions test result for the vehicle 30, notify law enforcement authorities, etc.

In some regulatory jurisdictions, as noted above, so-called "readiness indicators" may be evaluated at the beginning of an emissions test to determine whether the emissions test should proceed. If a predetermined number of readiness indicators are evaluated as being "unready" or "incomplete," the vehicle 30 will automatically fail the emissions test. Readiness indicators may be evaluated as being incomplete if the vehicle's battery was recently replaced, for example, or in general if the vehicle 30 has not been driven enough for the vehicle's onboard diagnostics to run completely since a repair or other event. Advantageously, the system 10 described herein may detect readiness indicators based on diagnostic data collected from the vehicle 30. If the readiness indicators are incomplete, the system 10 may notify the vehicle owner, saving the vehicle owner an unnecessary (premature) trip to an emissions test provider and/or a premature full test when readiness can be evaluated by an OBD-only pretest.

One common scenario in which the system 10 may evaluate readiness indicators to the benefit of the vehicle owner is as part of an OBD-only pretest as described above. Based on the OBD data received by the host emissions test server 201 from the emissions test provider, the expected emissions test result derived in step 850 may be a fail due to incomplete readiness indicators. The app 100 may inform the vehicle owner of the fail and provide instructions for how to operate the vehicle 30 in order to trigger complete readiness indicators (e.g., such as by driving the vehicle 30 a recommended number of miles).

Another example scenario in which the system 10 may evaluate readiness indicators to the benefit of the vehicle owner is in relation to providing a notification to the vehicle owner that it is time to get a vehicle emissions test. As explained above, the user profile 20 may include an emissions test schedule associated with the registered vehicle 30, and the server 200 may provide, to the mobile application 100, a notification based on the emissions test schedule included in the user profile 20. By the same token, the user profile 20 may include a record of readiness indicators associated with the registered vehicle 30. These readiness indicators may be evaluated based on diagnostic data collected by the servers 200, 201 in accordance with any of the processes described herein from any vehicle diagnostic or service events. The notification provided by the server 200 to the app 100 may thus be based on the record of readiness indicators included in the user profile 20. For example, the server 200 may provide a notification to the app 100 that notifies the user i) that the schedule indicates it is time for an emissions test but ii) that the readiness indicators are incomplete and it is recommended to drive the vehicle 30 for a specified number of additional miles before getting the emissions test.

Another example scenario in which the system 10 may evaluate readiness indicators may arise in a case where the vehicle owner has a data acquisition and transfer device (DAT) 102 that is present and in use in the vehicle 30 as described above. By using the DAT 102, the server 200 can evaluate the readiness indicators contemporaneously with the vehicle owner's present intention to get an emissions test, rather than relying on past record of readiness indicators stored in the user profile 20. For example, prior to providing the geolocation of the specified emissions test provider to the mobile application 100 in step 830 (see FIG. 8), the server 200 may retrieve diagnostic data from the vehicle 30 via the DAT 102 and determine whether a plurality of readiness indicators derived from the retrieved diagnostic data indicates readiness for emissions testing. The server 200 may then provide the geolocation of the emissions test provider to the app 100 in response to the plurality of readiness indicators indicating readiness in accordance with applicable regulations. In this way, a user of the app 100 who has a DAT 102 may benefit from a quick scan to evaluate readiness indicators prior to getting an emissions test and may thus avoid wasting time in a case where the readiness indicators are incomplete. One contemplated process flow is for the app 100 to notify the user that it is time for an emissions test based on an emissions test schedule stored in the user profile 20, for the user to tap a button on the notification or in the app 100 to do a quick readiness scan using the DAT 102, and for the app 100 to proceed with directing the user to a selected emissions test provider on the basis of the result of the readiness indicators. If the readiness indicators indicate that the vehicle 30 is not ready, the app 100 may instead recommend additional driving of the vehicle 30 as explained above.

In one possible use case of the system 10, a user of the app 100 may be a customer of an auto parts store and may get a diagnostic scan at the auto parts store for a purpose unrelated to emissions testing. The user may borrow a scan tool from the auto parts store and plug it into the OBD port of his/her vehicle 30. In this instance, the auto parts store may serve as a diagnostic service provider 300 and the scan tool may be a diagnostic tool that is sold by the same business entity that provides the app 100 and operates the servers 200, 201. Owing to the innovations described herein, the auto parts store may additionally serve as an emissions test provider, using the same diagnostic tool to provide emissions testing services to the customer. For example, as part of analyzing the diagnostic data, the server 200 may match the VIN in the data to a VIN in the user's user profile 20, which may store emissions testing schedule information for the vehicle 30. The server 200 may determine that the vehicle 30 is ready for an emissions test according to the relevant state regulations. The server 200 may further evaluate readiness indicators in the diagnostic data and determine that the vehicle 30 and confirm that they are complete. When the user hands the diagnostic tool back to the employee of the auto parts store, the employee sees that the vehicle 30 is ready for an emissions test. The employee informs the customer, "Your vehicle appears to be ready for an emissions test. Would you like to get the emissions test while you are here?" (If readiness indicators were incomplete, the employee may instead say, "Your vehicle seems to be due for an emissions test but readiness indicators are incomplete. You should drive the vehicle for a few miles and return here and we could complete the test later today."). Once the customer agrees to the emissions test (and possibly pays an additional fee), the host emissions test server 201 may provide the relevant portion of the OBD data to the state emissions test server 700 (e.g., in encrypted form) to generate the emissions test result. The host emissions test server 200 may then provide the emissions test result directly to the app 100 (e.g., via the server 200) for viewing by the user on the mobile communications device 101. Instead, or additionally, the host emissions test server 200 may provide the emissions test result back to the employee of the auto parts store (e.g., via the diagnostic tool), who may then print out a paper report of the emissions test result for the customer. The report in the app 100 may include a link, and the paper report may include a QR code, either of which may be used by the customer to initiate payment for the state-issued certificate and renew registration of the vehicle 30. The emissions test result may also be stored by the server 200 in the user profile 20 so that historical test results can be viewed by the vehicle owner and/or used for future analysis at a later time.

In some cases, the app 100 and/or the diagnostic tool used by the emissions test provider may include easy-to-understand symbols such as red, yellow, and green lights to provide the result of the emissions test to the customer and/or employee. If red (fail), the app 100 or diagnostic tool may suggest a fix and direct the user to the needed repair services/parts. If yellow (not ready), the app 100 or diagnostic tool may indicate incomplete readiness indicators and a suggested procedure to remedy. If green (pass), the app 100 or diagnostic tool may provide the user with a link to initiate the completion of the registration process.

Figure 9A:
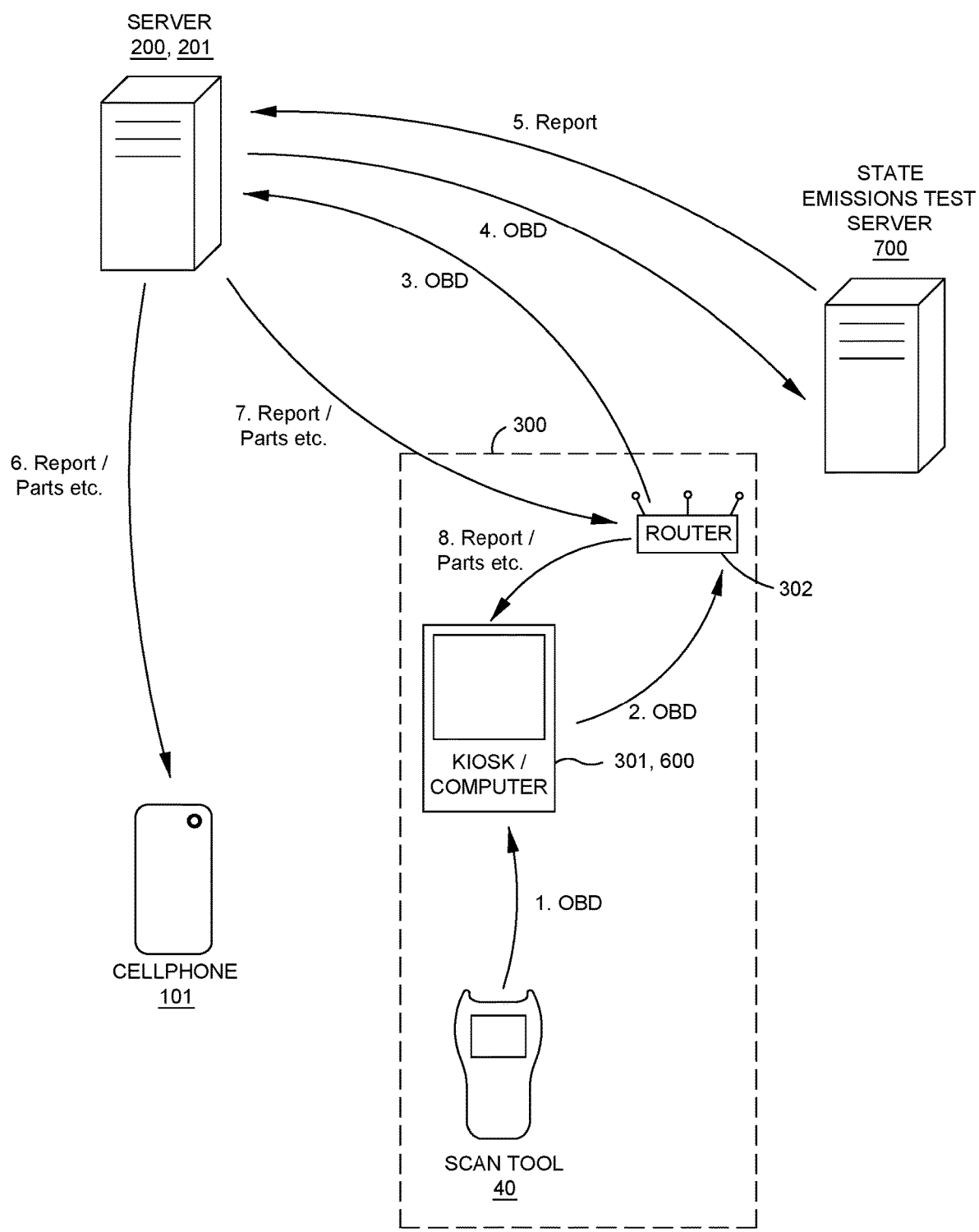
FIG. 9A shows an example data flow of the system in relation to the operational flow of FIG. 8.

FIG. 9A shows an example data flow of the system 10 in relation to the operational flow of FIG. 8 where the server 200 and/or server 201 acts as the host and communicates the OBD data to the state emissions test server 700. The data flow may begin with OBD data that is collected from the vehicle 30 being uploaded by a scan tool 40 serving as the diagnostic tool to a computer 301 or kiosk 600 located on-site at the auto parts store or other emissions test provider 300. In the case of the computer 301, the computer 301 may be a point-of-sale terminal of the auto parts store or other computer used in connection with the business of the emissions test provider 300. Alternatively, the computer 301 may be a dedicated machine for emissions testing that is isolated from any point-of-sale terminals or other computers used by the emissions test provider 300. In the case of the kiosk 600, the kiosk 600 may be operated by the provider of the scan tool 40, for example, which may be the same entity that operates the server 200 and/or server 201 and the provider of the app 100, for example. The OBD data may be sent by the computer 301 or kiosk 600 to the server 200 and/or server 201 via a router 302 that connects the emissions test provider 300 to the Internet. In this way, the server 200, 201 may receive the diagnostic data from the emissions test provider in accordance with step 840 of FIG. 8 as described above. Continuing to refer to FIG. 9A, the server 200, 201 may then transmit the OBD data to the state emissions test server 700 and receive, in response, a report including the emissions test result in accordance with step 860 of FIG. 8. In this way, the server 200, 201 may retrieve the emissions test result in accordance with step 860 of FIG. 8. The server 200, 201 may then provide the report as well as detailed diagnostics based on the report (using diagnostic databases 400 and information in the user profile 20, for example), including information about the most likely fix, needed parts, etc., to the app 100 so that the vehicle owner may view the information on his/her cell phone 101 (see step 870 of FIG. 8). The same information or a portion thereof may also be provided to the computer 301 or kiosk 600 via the router 302 as shown.

Figure 9B:
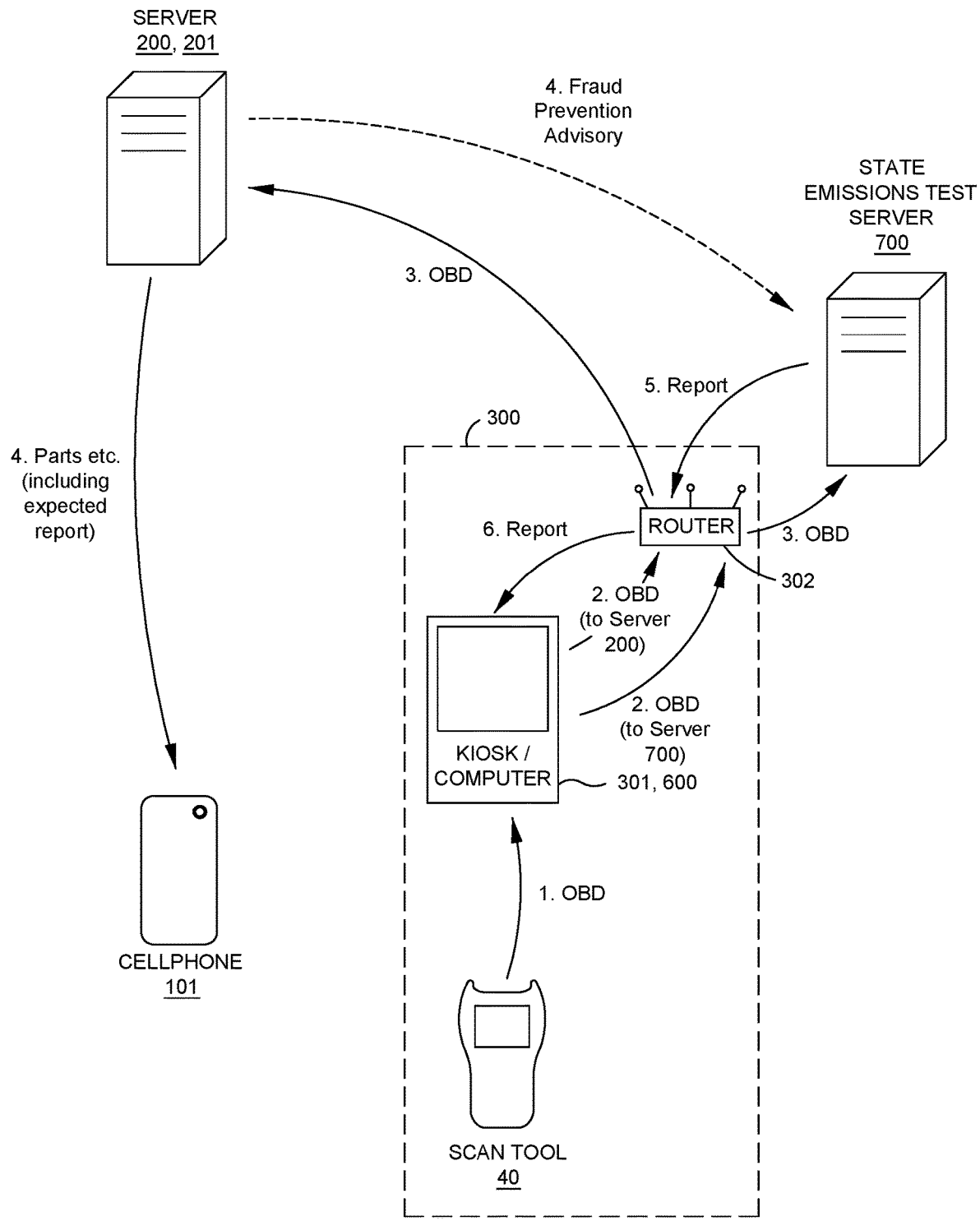
FIG. 9B shows another example data flow of the system in relation to the operational flow of FIG. 8.

FIG. 9B shows another example data flow of the system 10 in relation to the operational flow of FIG. 8. This time, the server 200 and/or server 201 do not act as the host but rather receive a parallel copy of the OBD data (or a portion thereof) from the emissions test provider 300. As in FIG. 9A, the data flow of FIG. 9B may begin with OBD data that is collected from the vehicle 30 being uploaded by the scan tool 40 to the computer 301 or kiosk 600 located at the emissions test provider 300. The OBD data may again be sent by the computer 301 or kiosk 600 to the server 200 and/or server 201 via the router 302 (see step 840 of FIG. 8). This time, however, the OBD data is also sent from the emissions test provider 300 to the state emissions test server 700 for the generation of the report including the emissions test result. The server 200, 201 may optionally serve in an advisory capacity for the benefit of the government authority responsible for generating the test result, for example, by providing analysis of the OBD data to find (and prevent) fraud in relation to the identity of the vehicle 30 and/or the modifications that may have been made to the emissions systems of the vehicle 30 or other hardware or software as described above. (It is noted that the same fraud prevention advisory information may be provided to the state emissions test server 700 in the example of FIG. 9A as well.) In parallel with the kiosk 301 or computer 600 receiving the report (and, advantageously, earlier in time), the server 200, 201 may derive an expected emissions test result based on the OBD data in accordance with step 850 of FIG. 8. The expected report, along with detailed diagnostics based on the report (using diagnostic databases 400 and information in the user profile 20, for example), including information about the most likely fix, needed parts, etc., may be provided to the app 100 so that the vehicle owner may view the information on his/her cell phone 101 (see step 870 of FIG. 8). In this instance, step 860 may be completely omitted as not performed by the server 200, 201 (though it may be performed by the emissions test provider 300 as shown, for example). While not separately illustrated, it is contemplated that the same detailed diagnostics or a portion thereof may also be provided to the computer 301 or kiosk 600 via the router 302.

Figure 9C:
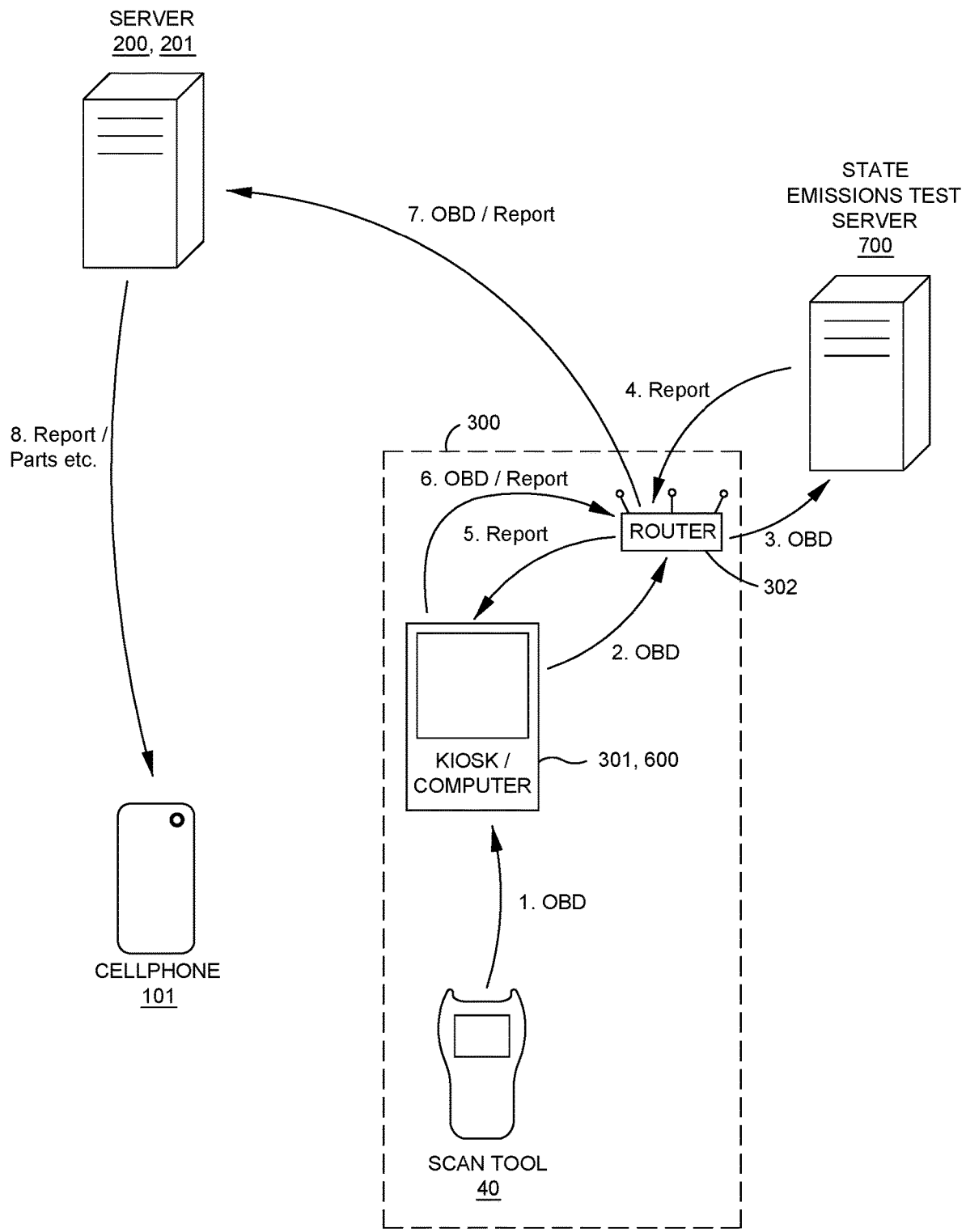
FIG. 9C shows another example data flow of the system in relation to the operational flow of FIG. 8.

FIG. 9C shows another example data flow of the system 10 in relation to the operational flow of FIG. 8. Whereas FIGS. 9A and 9B assume that the server 200, 201 is able to obtain the OBD data prior to the generation of the official report by the state emissions test server 700 (either because the server 200, 201 is the host or because the server 200, 201 receives the OBD data in parallel with the state emissions test server 700), FIGS. 9C, 9D, and 9E assume that this may not be possible or desirable (e.g., due to regulations). As in FIGS. 9A and 9B, the data flow of FIG. 9C may begin with OBD data that is collected from the vehicle 30 being uploaded by the scan tool 40 to the computer 301 or kiosk 600 located at the emissions test provider 300. The OBD data is then sent from the emissions test provider 300 to the state emissions test server 700 for the generation of the report including the emissions test result, which is received by the computer 301 or kiosk 600 via the router 302. This time, the computer 301 or kiosk 600 waits until the official report has been issued by the state emissions test server 700 before sending the OBD data (and/or the report itself) to the server 200, 201 in accordance with step 840 of FIG. 8. In this way, the state regulatory authority may be assured that the OBD data has not been tampered with prior to deriving the emissions test result (as may be required in some jurisdictions). The server 200, 201 may then derive detailed diagnostics based on the OBD data and/or the report (using diagnostic databases 400 and information in the user profile 20, for example), including information about the most likely fix, needed parts, etc., and the diagnostics and/or report may be provided to the app 100 so that the vehicle owner may view the information on his/her cell phone 101 (see step 870 of FIG. 8). Again, while not separately illustrated, it is contemplated that the same detailed diagnostics or a portion thereof may also be provided to the computer 301 or kiosk 600 via the router 302.

Figure 9D:
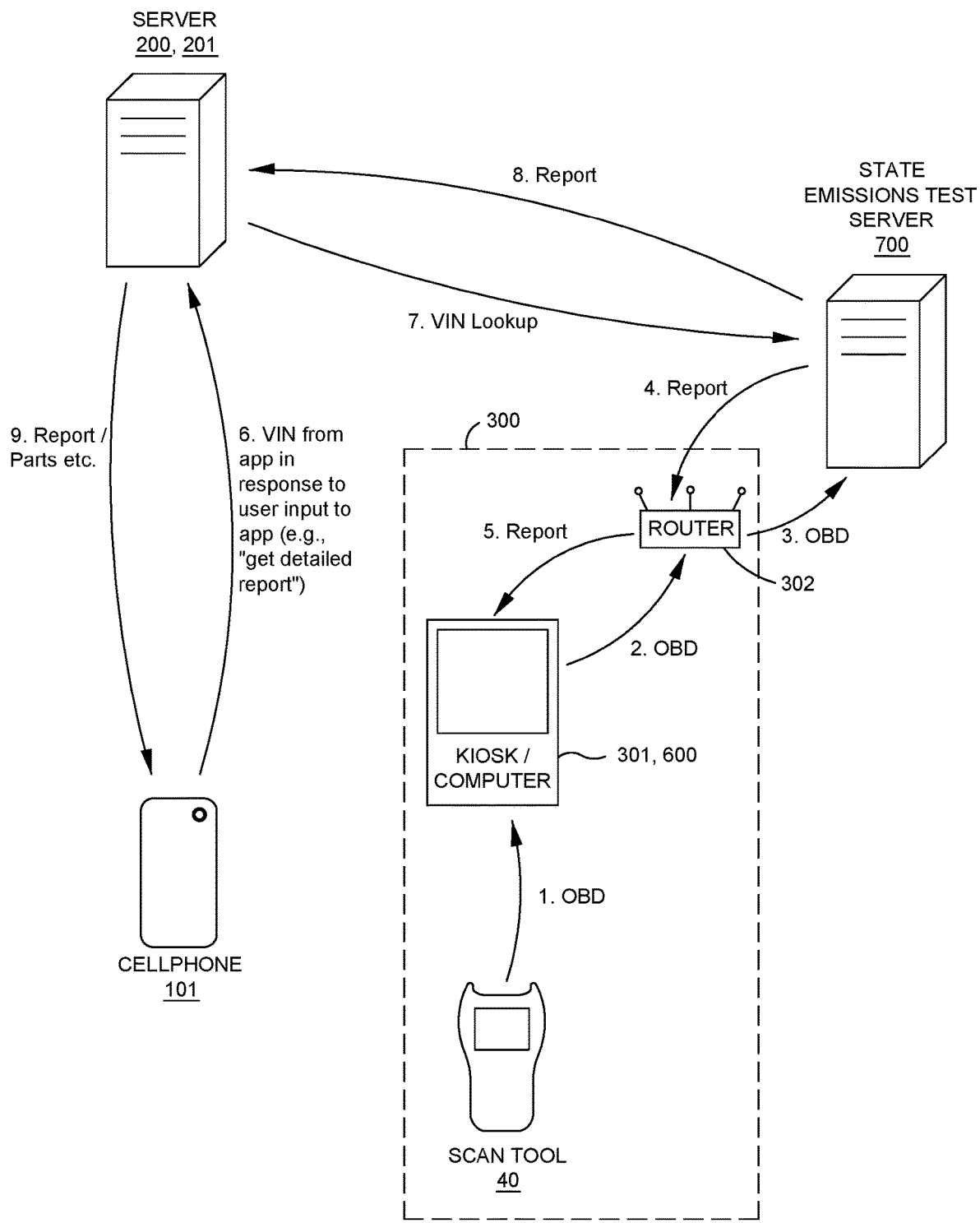
FIG. 9D shows another example data flow of the system in relation to the operational flow of FIG. 8.

FIG. 9D shows another example data flow of the system 10 in relation to the operational flow of FIG. 8. Unlike FIGS. 9A-9C, FIGS. 9D and 9E contemplate a scenario in which the server 200, 201 never obtains the OBD data at all but rather acts on the sidelines to provide value to app users. These embodiments may be useful in jurisdictions with highly restrictive emissions testing regulations, for example. As in FIGS. 9A-9C, the data flow of FIG. 9D may begin with OBD data that is collected from the vehicle 30 being uploaded by the scan tool 40 to the computer 301 or kiosk 600 located at the emissions test provider 300. The OBD data is then sent from the emissions test provider 300 to the state emissions test server 700 for the generation of the report including the emissions test result, which is received by the computer 301 or kiosk 600 via the router 302. At any time after undergoing the emissions test (e.g., before or after viewing the result of the test on a screen of the computer 301 or kiosk 600 or on a printout provided by the emissions test provider), the vehicle owner may input an instruction to the app 100 on his/her cell phone 101 to retrieve detailed information about the test result (e.g., by tapping a "get detailed report" button). This may effectively inform the server 200, 201 that the app user has gotten an emissions test, even in a case where the server 200, 201 does not communicate at all with the emissions test provider 300. In response to the user input on the app 100, the server 200, 201 may receive the VIN associated with the app user (which is stored in the corresponding user profile 20 or may also be included in the instruction received from the app 100). Using the VIN, the server 200, 201 may then query the state emissions test server 700 for the report including the test result in accordance with step 860 of FIG. 8. The server 200, 201 may then derive detailed diagnostics based on the report (using diagnostic databases 400 and information in the user profile 20, for example), including information about the most likely fix, needed parts, etc., and the diagnostics and/or report may be provided to the app 100 so that the vehicle owner may view the information on his/her cell phone 101 (see step 870 of FIG. 8). In this scenario, the operational flow of FIG. 8 may completely omit steps 840 and 850, for example.

Figure 9E:
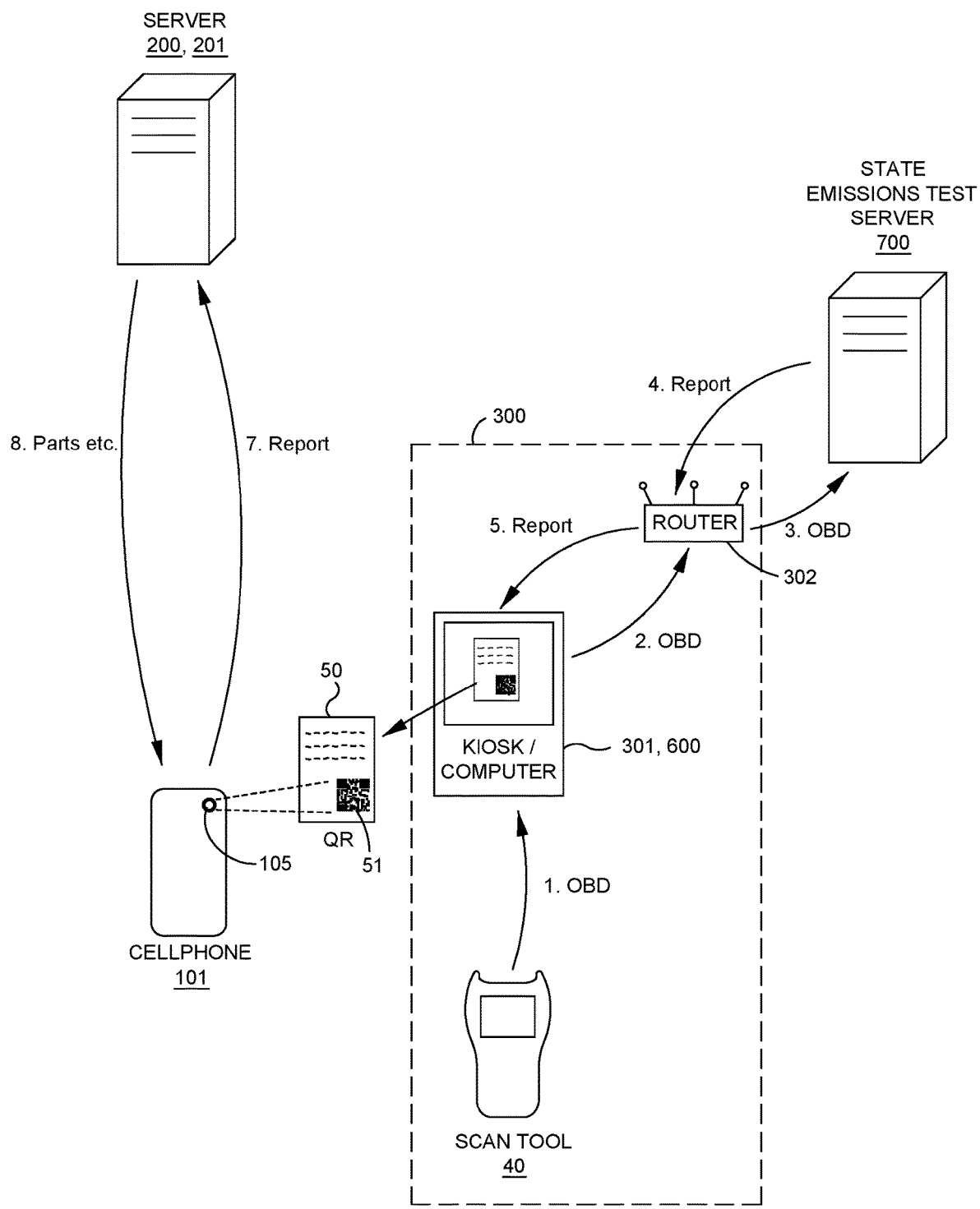
FIG. 9E shows another example data flow of the system in relation to the operational flow of FIG. 8.

FIG. 9E shows another example data flow of the system 10 in relation to the operational flow of FIG. 8. Like FIG. 9D, FIG. 9E contemplates a scenario in which the server 200, 201 never obtains the OBD data at all but rather acts on the sidelines to provide value to app users. As above, the data flow of FIG. 9E may begin with OBD data that is collected from the vehicle 30 being uploaded by the scan tool 40 to the computer 301 or kiosk 600 located at the emissions test provider 300. The OBD data is then sent from the emissions test provider 300 to the state emissions test server 700 for the generation of the report including the emissions test result, which is received by the computer 301 or kiosk 600 via the router 302. When viewing the result of the test on a screen of the computer 301 or kiosk 600 or on a printout provided by the emissions test provider, the vehicle owner may use a camera 105 of his/her cell phone 101 (e.g., accessed from the within the app 100) to ingest the substance of the report 50, for example, by scanning a barcode 51 such as a QR code or other two-dimensional barcode that encodes the substance of the report 50. The app 100 may then provide the substance of the report 50 to the server 200, 201, which may derive detailed diagnostics based on the report 50 (using diagnostic databases 400 and information in the user profile 20, for example), including information about the most likely fix, needed parts, etc. The diagnostics may be provided to the app 100 so that the vehicle owner may view the information on his/her cell phone 101 (see step 870 of FIG. 8). (It is noted that the report 50 itself may already be accessible to the user within the app 100 once the barcode 51 has been scanned.) In this scenario, the operational flow of FIG. 8 may completely omit steps 840-860, while step 870 may refer to the server 200, 201 providing the detailed diagnostics to the app 100 with or without a copy of the original report 50 (which may already be available on the cell phone 101 via the scanning of the barcode 51). It is contemplated that the barcode 51 included in the report 50 may be generated either by the state emissions test server 700 (depending on the jurisdiction) or by the computer 301 or kiosk 600. Advantageously, for example, kiosks 600 provided by the same entity that operates the server 200, 201 may include software for encoding the substance of the report 50 in a barcode 51. Examples of such functionality are described in Innova's U.S. patent application Ser. No. 17/573,205, filed Jan. 11, 2022, and U.S. patent application Ser. No. 17/666,115, filed Feb. 7, 2022, both entitled DIAGNOSTIC TOOL WITH QR CODE GENERATING CAPABILITY, incorporated by reference above.

In each of the above example data flows represented in FIGS. 9A-9E, the scan tool 40 is first connected to a computer 301 or kiosk 600 to upload the OBD data before the data is transmitted outside the emissions test provider 300 premises via the router 302 (either to the server 200, 201 or to the state emissions test server 700 as the case may be). However, in any of these data flows, the OBD data may instead be sent directly from the scan tool 40 to the external server (200, 201, or 700) via the router 302. The scan tool 40 may connect directly to the router 302 over a WiFi network or with an ethernet cable, for example. In this way the number of computers that receive the OBD data may be reduced, which may be necessary in order to comply with state law depending on the jurisdiction. In a case where the scan tool 40 sends the OBD data directly to the state emissions test server 700 via the router 302, the scan tool 40 itself may be regarded as functioning as the host (e.g., as the data acquisition server of DEQ's Remote OBD system in the state of Oregon). Along the same lines, it is further contemplated that the router 302 may also be bypassed in some iterations. In this case, the scan tool 40 may communicate with the external server (200, 201, or 700) via a cellular network, for example.

In the above examples described in relation to the operational flow of FIG. 8, it is mentioned that the diagnostic tool operated by the specified emissions test provider may typically be a "shared" or S-type device. However, the disclosure is not intended to be limited in this respect. A "continuous" or C-type device may also be used as the diagnostic tool, such as the vehicle owner's own DAT 102. In this case, steps 820 and 830 may be omitted since the diagnostic tool may already be present in the vehicle 30 and it may not be necessary to direct the user to an emissions test provider at a different location. Step 840 and the remainder of the operational flow of FIG. 8 may proceed as usual, with the host emissions test server 201 receiving the diagnostic data from the DAT 102 rather than from a diagnostic tool of an emissions test provider.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method performable by at least one server associated with a mobile application, the mobile application being installed on a mobile communication device that communicates with the at least one server to provide mobile application-based assistance with vehicle emissions testing compliance, the vehicle emissions testing compliance being determined by a government-authorized server on the basis of vehicle diagnostic data provided directly to the at least one server from an emissions test provider and thereafter directly to the government-authorized server from the at least one server, the method comprising:

establishing a user profile associated with a user of the mobile communication device, the user profile including a vehicle identification number (VIN) associated with a registered vehicle;

receiving, from an emissions test provider identified by the mobile application, diagnostic data retrieved from the vehicle using a diagnostic tool and subsequently uploaded to the at least one server, the received diagnostic data including the VIN associated with the registered vehicle;

providing the received diagnostic data to a government-authorized server that is capable of deriving an emissions test result for the registered vehicle based on the received diagnostic data;

receiving the emissions test result from the government-authorized server;

deriving a vehicle health report for the registered vehicle based on the received diagnostic data;

associating the emissions test result and the vehicle health report with the user profile by matching the VIN included in the received diagnostic data with the VIN included in the user profile; and
providing the emissions test result and the vehicle health report to the mobile communication device, the emissions test result and the vehicle health report being displayable on the mobile communication device by the mobile application.

2. The method of claim 1, wherein the emissions test provider is identified by the mobile application based on a locational relationship between the emissions test provider and the mobile communication device.

3. The method of claim 1, further comprising identifying vehicle-specific parts needed to repair a defect in the vehicle identified by the emissions test result.

4. The method of claim 3, wherein said identifying vehicle-specific parts comprises identifying one or more universal part numbers.

5. The method of claim 1, further comprising identifying, based on the received diagnostic data, a defect in the registered vehicle that is inconsistent with the emissions test result indicating a passed emissions test.

6. The method of claim 5, further comprising identifying, based on the received diagnostic data, a further defect in the registered vehicle that is consistent with the emissions test result indicating a passed emissions test.

7. The method of claim 5, further comprising identifying, based on the received diagnostic data, a predicted defect that is predicted to occur within a predefined period of time.

8. The method of claim 5, further comprising identifying vehicle-specific repairs based on the defect.

9. The method of claim 1, further comprising:
receiving, from the mobile communication device, a geolocation of the mobile communication device; and
providing, to the mobile communication device, a geolocation of the emissions test provider based on a relationship between the geolocation of the emissions test provider and the geolocation of the mobile communication device.

10. The method of claim 1, further comprising:
receiving, from the mobile communication device, a geolocation of the mobile communication device; and
providing, to the mobile communication device, a geolocation of at least one auto repair service provider based on a locational relationship between the geolocation of the at least one auto repair service provider and the geolocation of the mobile communication device, the at least one auto repair service provider having a capability to repair a defect indicated by the emissions test result.

11. The method of claim 10, further comprising:
receiving a bid for repairing the defect from the at least one auto repair service provider; and
providing the bid to the mobile communication device.

12. The method of claim 10, further comprising providing a vehicle data package to the at least one auto repair service provider.

13. The method of claim 10, wherein said providing the geolocation of the at least one auto repair service provider comprises providing geolocations of a plurality of auto repair service providers within a predetermined distance from the mobile communication device.

14. The method of claim 10, wherein said providing the geolocation of the at least one auto repair service provider comprises providing geolocations of a plurality of auto repair service providers within a predetermined travel time of the mobile communication device.

15. The method of claim 1, further comprising:
receiving, from the mobile communication device, a geolocation of the mobile communication device; and
providing, to the mobile communication device, a geolocation of at least one auto parts provider based on a locational relationship between the geolocation of the at least one auto parts provider and the geolocation of the mobile communication device, the at least one auto parts provider having parts suitable to repair a defect indicated by the emissions test result.

16. The method of claim 15, further comprising:
receiving a bid for the sale of parts from the at least one auto parts provider; and
providing the bid to the mobile communication device.

17. The method of claim 15, further comprising providing a vehicle data package to the at least one auto parts provider.

18. The method of claim 15, wherein said providing the geolocation of the at least one auto parts provider comprises providing geolocations of a plurality of auto parts providers within a predetermined distance from the mobile communication device.

19. The method of claim 15, wherein said providing the geolocation of the at least one auto parts provider comprises providing geolocations of a plurality of auto parts providers within a predetermined travel time of the mobile communication device.

20. The method of claim 1, further comprising:
deriving an expected emissions test result from the received diagnostic data independent of the derivation of the emissions test result by the government-authorized server; and
providing the expected emissions test result to the mobile communication device.

21. The method of claim 20, wherein said deriving the expected emissions test result comprises determining whether a plurality of readiness indicators derived from the received diagnostic data indicates readiness for emissions testing.

22. The method of claim 1, further comprising, prior to said providing the geolocation of the emissions test provider, receiving preliminary diagnostic data from the registered vehicle retrieved using a data acquisition and transfer (DAT) device present in the registered vehicle and determining whether a plurality of readiness indicators derived from the preliminary diagnostic data indicates readiness for emissions testing, wherein said providing the geolocation of the emissions test provider is enabled in response to the plurality of readiness indicators indicating readiness for emissions testing.

23. The method of claim 1, further comprising determining, based on an evaluation of the received diagnostic data, whether an emissions control system of the registered vehicle has been tampered with.

24. The method of claim 23, further comprising determining, based on an evaluation of the received diagnostic data, whether any tampering with the emission control system of the registered vehicle comprises installation of a defeat device.

25. The method of claim 23, further comprising providing a result of the determination to the government-authorized server.

26. The method of claim 23, further comprising associating the result of the tampering determination with the user profile by matching the VIN included in the received diagnostic data with the VIN included in the user profile.

27. The method of claim 1, wherein said receiving the diagnostic data comprises receiving the diagnostic data from a computer system hosted by the emissions test provider, the computer system being communicable with the diagnostic tool.

28. The method of claim 27, wherein the computer system comprises a kiosk.

29. The method of claim 1, wherein said associating the emissions test result with the user profile proceeds autonomously in response to the receipt of the diagnostic data from the emissions test provider.

30. The method of claim 1, wherein said providing the emissions test result to the mobile communication device comprises providing a link by which the user can access the emissions test result.

31. The method of claim 1, wherein said providing the emissions test result to the mobile communication device proceeds autonomously in response to the receipt of the diagnostic data from the emissions test provider.

32. The method of claim 1, wherein said providing the vehicle health report to the mobile communication device comprises providing a link by which the user can access the vehicle health report.

33. A computer program product comprising one or more non-transitory program storage media on which are stored instructions executable by one or more processors or programmable circuits of at least one server to perform operations for providing mobile application-based assistance with vehicle emissions testing compliance, the vehicle emissions testing compliance being determined by a government-authorized server on the basis of vehicle diagnostic data provided directly to the at least one server from an emissions test provider and thereafter directly to the government-authorized server from the at least one server, the operations comprising:
  establishing a user profile associated with a user of a mobile communication device, the user profile including a vehicle identification number (VIN) associated with a registered vehicle;
  receiving, from an emissions test provider identified by a mobile application installed on the mobile communication device, diagnostic data retrieved from the vehicle using a diagnostic tool and subsequently uploaded to the at least one server, the received diagnostic data including the VIN associated with the registered vehicle;
  providing the received diagnostic data to a government-authorized server that is capable of deriving an emissions test result for the registered vehicle based on the received diagnostic data;
  receiving the emissions test result from the government-authorized server;
  deriving a vehicle health report for the registered vehicle based on the received diagnostic data;
  associating the emissions test result and the vehicle health report with the user profile by matching the VIN included in the received diagnostic data with the VIN included in the user profile; and
  providing the emissions test result and the vehicle health report to the mobile communication device, the emissions test result and the vehicle health report being displayable on the mobile communication device by the mobile application.

34. A system comprising:
  the computer program product of claim 33; and
  the at least one server.

35. The system of claim 34, further comprising the mobile communication device on which the mobile application is installed.

36. A method performable by at least one server associated with a mobile application, the mobile application being installed on a mobile communication device that communicates with the at least one server to provide mobile application-based assistance with vehicle emissions testing compliance, the vehicle emissions testing compliance being determined by a government-authorized server on the basis of vehicle diagnostic data provided directly to the government-authorized server from an emissions test provider that also provides the vehicle diagnostic data directly to the at least one server, the method comprising:
  establishing a user profile associated with a user of the mobile communication device, the user profile including a vehicle identification number (VIN) associated with a registered vehicle;
  receiving, from an emissions test provider identified by the mobile application, diagnostic data retrieved from the vehicle using a diagnostic tool and subsequently uploaded both to the at least one server associated with the mobile application and to a government-authorized server that is capable of deriving an emissions test result for the registered vehicle based on the uploaded diagnostic data;
  retrieving the emissions test result from the government-authorized server using a VIN included in the received diagnostic data;
  deriving a vehicle health report for the registered vehicle based on the received diagnostic data;
  associating the emissions test result and the vehicle health report with the user profile by matching the VIN included in the received diagnostic data with the VIN included in the user profile; and
  providing the emissions test result and the vehicle health report to the mobile communication device, the emissions test result and the vehicle health report being displayable on the mobile communication device by the mobile application.

37. The method of claim 36, wherein said associating the emissions test result with the user profile proceeds autonomously in response to the receipt of the diagnostic data from the emissions test provider.

38. The method of claim 36, wherein said providing the emissions test result to the mobile communication device proceeds autonomously in response to the receipt of the diagnostic data from the emissions test provider.

39. A computer program product comprising one or more non-transitory program storage media on which are stored instructions executable by one or more processors or programmable circuits of at least one server to perform operations for providing mobile application-based assistance with vehicle emissions testing compliance, the vehicle emissions testing compliance being determined by a government-authorized server on the basis of vehicle diagnostic data provided directly to the government-authorized server from an emissions test provider that also provides the vehicle diagnostic data directly to the at least one server, the operations comprising:
  establishing a user profile associated with a user of a mobile communication device, the user profile including a vehicle identification number (VIN) associated with a registered vehicle;
  receiving, from an emissions test provider identified by a mobile application installed on the mobile communication device, diagnostic data retrieved from the vehicle using a diagnostic tool and subsequently uploaded both to the at least one server associated with the mobile application and to a government-authorized server that is capable of deriving an emissions test result for the registered vehicle based on the uploaded diagnostic data;

retrieving the emissions test result from the government-authorized server using a VIN included in the received diagnostic data;

deriving a vehicle health report for the registered vehicle based on the received diagnostic data;

associating the emissions test result and the vehicle health report with the user profile by matching the VIN included in the received diagnostic data with the VIN included in the user profile; and providing the emissions test result and the vehicle health report to the mobile communication device, the emissions test result and the vehicle health report being displayable on the mobile communication device by the mobile application.

40. A system comprising:
the computer program product of claim 39; and
the at least one server.

41. The system of claim 40, further comprising the mobile communication device on which the mobile application is installed.

42. A method performable by at least one server associated with a mobile application, the mobile application being installed on a mobile communication device that communicates with the at least one server to provide mobile application-based assistance with vehicle emissions testing compliance, the vehicle emissions testing compliance being determined by a government-authorized server on the basis of vehicle diagnostic data provided directly to the government-authorized server from an emissions test provider, the method comprising:

establishing a user profile associated with a user of the mobile communication device, the user profile including a vehicle identification number (VIN) associated with a registered vehicle;

receiving a request for an emissions test result from the mobile communication device, the request having been issued in response to a user input to the mobile application;

in response to the request for the emissions test result, retrieving the emissions test result from a government-authorized server using the VIN associated with the registered vehicle, the emissions test result having been derived by the government-authorized server based on diagnostic data retrieved from the vehicle using a diagnostic tool provided by an emissions test provider identified by the mobile application and subsequently uploaded to the government-authorized server;

associating the emissions test result with the user profile that includes the VIN associated with the registered vehicle; and providing the emissions test result to the mobile communication device on which the mobile application is installed, the emissions test result being displayable on the mobile communication device by the mobile application.

43. The method of claim 42, wherein said retrieving the emissions test result includes retrieving the VIN associated with the registered vehicle from the user profile in response to the request for the emission test result.

44. The method of claim 42, wherein the request for the emission test result includes the VIN associated with the registered vehicle.

45. The method of claim 42, wherein said associating the emissions test result with the user profile proceeds autonomously in response to the request for the emissions test result.

46. The method of claim 42, wherein said providing the emissions test result to the mobile communication device proceeds autonomously in response to the request for the emissions test result.

47. The method of claim 42, further comprising identifying vehicle-specific parts needed to repair a defect in the vehicle identified by the emissions test result.

48. The method of claim 47, wherein said identifying vehicle-specific parts proceeds autonomously in response to the request for the emissions test result.

49. The method of claim 42, further comprising:
receiving a request for a vehicle health report from the mobile communication device, the request having been issued in response to a user input to the mobile application;

in response to the request for the vehicle health report, retrieving the diagnostic data from the emissions test provider, deriving the vehicle health report based on the diagnostic data, associating the vehicle health report with the user profile that includes the VIN associated with the registered vehicle, and providing the vehicle health report to the mobile communication device, the vehicle health report being displayable on the mobile communication device by the mobile application.

50. The method of claim 49, wherein the request for the vehicle health report is enabled after the emissions test result has been derived by the government-authorized server.

51. A computer program product comprising one or more non-transitory program storage media on which are stored instructions executable by one or more processors or programmable circuits of at least one server to perform operations for providing mobile application-based assistance with vehicle emissions testing compliance, the vehicle emissions testing compliance being determined by a government-authorized server on the basis of vehicle diagnostic data provided directly to the government-authorized server from an emissions test provider, the operations comprising:

establishing a user profile associated with a user of a mobile communication device, the user profile including a vehicle identification number (VIN) associated with a registered vehicle;

receiving a request for an emissions test result from the mobile communication device, the request having been issued in response to a user input to a mobile application installed on the mobile communication device;

in response to the request for the emissions test result, retrieving the emissions test result from a government-authorized server using the VIN associated with the registered vehicle, the emissions test result having been derived by the government-authorized server based on diagnostic data retrieved from the vehicle using a diagnostic tool provided by an emissions test provider identified by the mobile application and subsequently uploaded to the government-authorized server;

associating the emissions test result with the user profile that includes the VIN associated with the registered vehicle; and providing the emissions test result to the mobile communication device on which the mobile application is installed, the emissions test result being displayable on the mobile communication device by the mobile application.

52. A system comprising:
the computer program product of claim 51; and
the at least one server.

53. The system of claim 52, further comprising the mobile communication device on which the mobile application is installed.

54. A method performable by a mobile communication device having an installed mobile application that communicates with at least one server to provide mobile application-based assistance with vehicle emissions testing compliance, the vehicle emissions testing compliance being determined by a government-authorized server on the basis of vehicle diagnostic data provided directly to the at least one server from an emissions test provider and thereafter directly to the government-authorized server from the at least one server, the method comprising:
establishing a user profile associated with a user of the mobile communication device, the user profile including a vehicle identification number (VIN) associated with a registered vehicle;
generating an emissions scan request in response to a first user input to the mobile application;
determining a first geolocation of the mobile communication device;
in response to the emissions scan request, identifying a geolocation of at least one emissions test provider based on a locational relationship between the geolocation of the emissions test provider(s) and a geolocation of the mobile communication device, the emissions test provider(s) being capable of providing a diagnostic tool to retrieve diagnostic data from the registered vehicle and upload the diagnostic data to the at least one server;
receiving the emissions test result from the at least one server, the emissions test result having been received by the at least one server from a government-authorized server, the government-authorized server having derived the emissions test result based on the diagnostic data in response to the diagnostic data being uploaded from the at least one server to the government-authorized server, the emissions test result being associated with the user profile based on a match between the VIN included in the diagnostic data and the VIN included in the user profile;
receiving a vehicle health report for the registered vehicle, the vehicle health report having been derived by the at least one server based on the diagnostic data and associated with the user profile based on the match between the VIN included in the diagnostic data and the VIN included in the user profile; and
displaying the emissions test result and the vehicle health report on the mobile communication device.

55. The method of claim 54, wherein said identifying the geolocation of the at least one emissions test provider proceeds autonomously in response to the emissions scan request.

56. The method of claim 54, wherein said identifying the geolocation of the at least one emissions test provider comprises identifying a plurality of emissions test providers within a predetermined distance from the mobile communication device.

57. The method of claim 54, wherein said identifying the geolocation of the at least one emissions test provider comprises identifying a plurality of emissions test providers within a predetermined travel time from the mobile communication device.

58. The method of claim 54, wherein said receiving the emissions test result proceeds autonomously in response to the diagnostic data being uploaded to the at least one server.

59. The method of claim 54, wherein said determining the first geolocation of the mobile communication device is in response to the emissions scan request.

60. The method of claim 54, wherein said receiving the emissions test result on the mobile communication device comprises receiving a link by which the user may access the emissions test result.

61. The method of claim 54, wherein said receiving the vehicle health report on the mobile communication device comprises receiving a link by which the user may access the vehicle health report.

62. A computer program product comprising one or more non-transitory program storage media on which are stored instructions executable by one or more processors or programmable circuits of a mobile communication device that communicates with at least one server to perform operations for providing mobile application-based assistance with vehicle emissions testing compliance, the vehicle emissions testing compliance being determined by a government-authorized server on the basis of vehicle diagnostic data provided directly to the at least one server from an emissions test provider and thereafter directly to the government-authorized server from the at least one server, the operations comprising:
establishing a user profile associated with a user of the mobile communication device, the user profile including a vehicle identification number (VIN) associated with a registered vehicle;
generating an emissions scan request in response to a first user input to the mobile communication device;
determining a first geolocation of the mobile communication device;
in response to the emissions scan request, identifying a geolocation of at least one emissions test provider based on a locational relationship between the geolocation of the emissions test provider(s) and a geolocation of the mobile communication device, the emissions test provider(s) being capable of providing a diagnostic tool to retrieve diagnostic data from the registered vehicle and upload the diagnostic data to the at least one server;
receiving the emissions test result from the at least one server, the emissions test result having been received by the at least one server from a government-authorized server, the government-authorized server having derived the emissions test result based on the diagnostic data in response to the diagnostic data being uploaded from the at least one server to the government-authorized server, the emissions test result being associated with the user profile based on a match between the VIN included in the diagnostic data and the VIN included in the user profile;
receiving a vehicle health report for the registered vehicle, the vehicle health report having been derived by the at least one server based on the diagnostic data and associated with the user profile based on the match between the VIN included in the diagnostic data and the VIN included in the user profile; and
displaying the emissions test result and the vehicle health report on the mobile communication device.

63. A system comprising:
the computer program product of claim 62; and
the mobile communication device.

64. The system of claim 63, further comprising the at least one server.

65. A method performable by a mobile communication device having an installed mobile application that communicates with at least one server to provide mobile application-based assistance with vehicle emissions testing compliance, the vehicle emissions testing compliance being determined by a government-authorized server on the basis of vehicle diagnostic data provided directly to the government-authorized server from an emissions test provider that also provides the vehicle diagnostic data directly to the at least one server, the method comprising:
- establishing a user profile associated with a user of the mobile communication device, the user profile including a vehicle identification number (VIN) associated with a registered vehicle;
- generating an emissions scan request in response to a first user input to the mobile application;
- determining a first geolocation of the mobile communication device;
- in response to the emissions scan request, identifying a geolocation of at least one emissions test provider based on a locational relationship between the geolocation of the emissions test provider(s) and a geolocation of the mobile communication device, the emissions test provider(s) being capable of providing a diagnostic tool to retrieve diagnostic data from the registered vehicle and upload the diagnostic data both to the at least one server and to a government-authorized server, the government authorized server being capable of deriving an emissions test result for the registered vehicle based on the diagnostic data;
- receiving the emissions test result from the at least one server, the emissions test result having been retrieved by the at least one server from the government-authorized server using a VIN included in the diagnostic data uploaded to the at least one server, the emissions test result being associated with the user profile based on a match between the VIN included in the diagnostic data and the VIN included in the user profile;
- receiving a vehicle health report for the registered vehicle, the vehicle health report having been derived by the at least one server based on the diagnostic data and associated with the user profile based on the match between the VIN included in the diagnostic data and the VIN included in the user profile; and
- displaying the emissions test result and the vehicle health report on the mobile communication device.

66. The method of claim 65, wherein said receiving the emissions test result proceeds autonomously in response to the diagnostic data being uploaded to the at least one server.

67. A computer program product comprising one or more non-transitory program storage media on which are stored instructions executable by one or more processors or programmable circuits of a mobile communication device that communicates with at least one server to perform operations for providing mobile application-based assistance with vehicle emissions testing compliance, the vehicle emissions testing compliance being determined by a government-authorized server on the basis of vehicle diagnostic data provided directly to the government-authorized server from an emissions test provider that also provides the vehicle diagnostic data directly to the at least one server, the operations comprising:
- establishing a user profile associated with a user of the mobile communication device, the user profile including a vehicle identification number (VIN) associated with a registered vehicle;
- generating an emissions scan request in response to a first user input to the mobile communication device;
- determining a first geolocation of the mobile communication device;
- in response to the emissions scan request, identifying a geolocation of at least one emissions test provider based on a locational relationship between the geolocation of the emissions test provider(s) and a geolocation of the mobile communication device, the emissions test provider(s) being capable of providing a diagnostic tool to retrieve diagnostic data from the registered vehicle and upload the diagnostic data both to the at least one server and to a government-authorized server, the government authorized server being capable of deriving an emissions test result for the registered vehicle based on the diagnostic data;
- receiving the emissions test result from the at least one server, the emissions test result having been retrieved by the at least one server from the government-authorized server using a VIN included in the diagnostic data uploaded to the at least one server, the emissions test result being associated with the user profile based on a match between the VIN included in the diagnostic data and the VIN included in the user profile;
- receiving a vehicle health report for the registered vehicle, the vehicle health report having been derived by the at least one server based on the diagnostic data and associated with the user profile based on the match between the VIN included in the diagnostic data and the VIN included in the user profile; and
- displaying the emissions test result and the vehicle health report on the mobile communication device.

68. A system comprising:
the computer program product of claim 67; and
the mobile communication device.

69. The system of claim 68, further comprising the at least one server.

70. A method performable by a mobile communication device having an installed mobile application that communicates with at least one server to provide mobile application-based assistance with vehicle emissions testing compliance, the vehicle emissions testing compliance being determined by a government-authorized server on the basis of vehicle diagnostic data provided directly to the government-authorized server from an emissions test provider, the method comprising:
- establishing a user profile associated with a user of the mobile communication device, the user profile including a vehicle identification number (VIN) associated with a registered vehicle;
- generating an emissions scan request in response to a first user input to the mobile application;
- determining a first geolocation of the mobile communication device;
- in response to the emissions scan request, identifying a geolocation of at least one emissions test provider based on a relationship between the geolocation of the emissions test provider(s) and a geolocation of the mobile communication device, the emissions test provider(s) being capable of providing a diagnostic tool to retrieve diagnostic data from the registered vehicle and upload the diagnostic data to a government-authorized server, the government authorized server being capable of deriving an emissions test result for the registered vehicle based on the diagnostic data;

issuing a request for an emissions test result to the at least one server in response to a second user input to the mobile application;

receiving the emissions test result from the at least one server, the emissions test result having been retrieved by the at least one server from the government-authorized server, in response to the request for the emissions test result, using a VIN associated with the registered vehicle, the emissions test result being associated with the user profile that includes the VIN associated with the registered vehicle; and displaying the emissions test result on the mobile communication device.

71. The method of claim 70, wherein the VIN associated with the registered vehicle is retrieved by the at least one server from the user profile in response to the request for the emissions test result.

72. The method of claim 70, wherein the request for the emission test result includes the VIN.

73. The method of claim 70, wherein said receiving the emissions test result proceeds autonomously in response to the request for the emissions test result.

74. The method of claim 70, further comprising:

issuing a request for a vehicle health report to the at least one server in response to a third user input to the mobile application;

receiving the vehicle health report from the at least one server, the at least one server having retrieved the diagnostic data from the emissions test provider(s) and derived the vehicle health report based on the diagnostic data in response to the request for the vehicle health report, the vehicle health report being associated with the user profile that includes the VIN associated with the registered vehicle; and displaying the vehicle health report on the mobile communication device.

75. The method of claim 74, wherein the request for the vehicle health report is enabled after the emissions test result has been derived by the government-authorized server.

76. A computer program product comprising one or more non-transitory program storage media on which are stored instructions executable by one or more processors or programmable circuits of a mobile communication device that communicates with at least one server to perform operations for providing mobile application-based assistance with vehicle emissions testing compliance, the vehicle emissions testing compliance being determined by a government-authorized server on the basis of vehicle diagnostic data provided directly to the government-authorized server from an emissions test provider, the operations comprising:

establishing a user profile associated with a user of the mobile communication device, the user profile including a vehicle identification number (VIN) associated with a registered vehicle;

generating an emissions scan request in response to a first user input to the mobile communication device;

determining a first geolocation of the mobile communication device;

in response to the emissions scan request, identifying a geolocation of at least one emissions test provider based on a relationship between the geolocation of the emissions test provider(s) and a geolocation of the mobile communication device, the emissions test provider(s) being capable of providing a diagnostic tool to retrieve diagnostic data from the registered vehicle and upload the diagnostic data to a government-authorized server, the government authorized server being capable of deriving an emissions test result for the registered vehicle based on the diagnostic data;

issuing a request for an emissions test result to the at least one server in response to a second user input to the mobile application;

receiving the emissions test result from the at least one server, the emissions test result having been retrieved by the at least one server from the government-authorized server, in response to the request for the emissions test result, using a VIN associated with the registered vehicle, the emissions test result being associated with the user profile that includes the VIN associated with the registered vehicle; and displaying the emissions test result on the mobile communication device.

77. A system comprising:

the computer program product of claim 76; and the mobile communication device.

78. The system of claim 77, further comprising the at least one server.

* * * * *